United States Patent
Seow et al.

(10) Patent No.: US 12,478,246 B2
(45) Date of Patent: Nov. 25, 2025

(54) ROBOTIC SURGICAL ASSEMBLIES AND ADAPTER ASSEMBLIES THEREOF

(71) Applicant: Covidien LP, Mansfield, MA (US)

(72) Inventors: Chi Min Seow, Watertown, MA (US); Jaimeen Kapadia, Cambridge, MA (US); Michael Zemlok, Prospect, CT (US); Mark MacLeod, Brookfield, CT (US)

(73) Assignee: Covidien LP, Mansfield, MA (US)

( * ) Notice: Subject to any disclaimer, the term of this patent is extended or adjusted under 35 U.S.C. 154(b) by 0 days.

(21) Appl. No.: 18/441,615

(22) Filed: Feb. 14, 2024

(65) Prior Publication Data
US 2024/0180400 A1  Jun. 6, 2024

Related U.S. Application Data

(63) Continuation of application No. 16/961,321, filed as application No. PCT/US2019/012834 on Jan. 9, 2019, now abandoned.
(Continued)

(51) Int. Cl.
*A61B 1/00* (2006.01)
*A61B 17/00* (2006.01)
(Continued)

(52) U.S. Cl.
CPC ...... *A61B 1/00121* (2013.01); *A61B 1/00133* (2013.01); *A61B 1/00149* (2013.01);
(Continued)

(58) Field of Classification Search
CPC ................ A61B 34/37; A61B 34/30; A61B 2017/00486; A61B 2017/00477; A61B 50/20; A61M 25/02
See application file for complete search history.

(56) References Cited

U.S. PATENT DOCUMENTS 2,957,353 A   10/1960   Babacz
3,111,328 A   11/1963   Di Rito et al.
(Continued)

FOREIGN PATENT DOCUMENTS

CA   2451558 A1   1/2003
CN   1547454 A    11/2004
(Continued)

OTHER PUBLICATIONS

Japanese Office Action dated Jul. 2, 2021, issued in corresponding JP Appln. No. 2020537692, 3 pages.
(Continued)

*Primary Examiner* — Anh Tuan T Nguyen
*Assistant Examiner* — Rynae E Boler
(74) *Attorney, Agent, or Firm* — Carter, DeLuca & Farrell LLP

(57) ABSTRACT

Adapter assemblies for connecting an endoscope to a robotic surgical system include a proximal housing, a distal housing, and a drive assembly. The distal housing is rotatable relative to the proximal housing via the drive assembly. A surgical assembly for interconnecting an endoscope and a surgical robotic arm includes a surgical instrument holder and an adapter assembly configured for receipt within the surgical instrument holder.

17 Claims, 25 Drawing Sheets

Related U.S. Application Data

(60) Provisional application No. 62/615,677, filed on Jan. 10, 2018.

(51) Int. Cl.
*A61B 34/30* (2016.01)
*A61B 34/37* (2016.01)

(52) U.S. Cl.
CPC ............ *A61B 1/0016* (2013.01); *A61B 34/37* (2016.02); *A61B 2034/301* (2016.02); *A61B 2034/302* (2016.02)

(56) References Cited

U.S. PATENT DOCUMENTS

| | | | |
|---|---|---|---|
| 3,695,058 A | 10/1972 | Keith, Jr. | |
| 3,734,515 A | 5/1973 | Dudek | |
| 3,759,336 A | 9/1973 | Marcovitz et al. | |
| 4,162,399 A | 7/1979 | Hudson | |
| 4,606,343 A | 8/1986 | Conta et al. | |
| 4,683,772 A | 8/1987 | Colimitra | |
| 4,705,038 A | 11/1987 | Sjostrom et al. | |
| 4,722,685 A | 2/1988 | de Estrada et al. | |
| 4,823,807 A | 4/1989 | Russell et al. | |
| 4,862,759 A | 9/1989 | Trevelyan et al. | |
| 4,874,181 A | 10/1989 | Hsu | |
| 5,129,118 A | 7/1992 | Walmesley | |
| 5,129,570 A | 7/1992 | Schulze et al. | |
| 5,152,744 A | 10/1992 | Krause | |
| 5,301,061 A | 4/1994 | Nakada et al. | |
| 5,312,023 A | 5/1994 | Green et al. | |
| 5,326,013 A | 7/1994 | Green et al. | |
| 5,350,355 A | 9/1994 | Sklar | |
| 5,383,874 A | 1/1995 | Jackson et al. | |
| 5,383,880 A | 1/1995 | Hooven | |
| 5,389,098 A | 2/1995 | Tsuruta et al. | |
| 5,395,033 A | 3/1995 | Byrne et al. | |
| 5,400,267 A | 3/1995 | Denen et al. | |
| 5,411,508 A | 5/1995 | Bessler et al. | |
| 5,413,267 A | 5/1995 | Solyntjes et al. | |
| 5,427,087 A | 6/1995 | Ito et al. | |
| 5,433,721 A | 7/1995 | Hooven et al. | |
| 5,467,911 A | 11/1995 | Tsuruta et al. | |
| 5,476,379 A | 12/1995 | Disel | |
| 5,487,499 A | 1/1996 | Sorrentino et al. | |
| 5,518,163 A | 5/1996 | Hooven | |
| 5,518,164 A | 5/1996 | Hooven | |
| 5,526,822 A | 6/1996 | Burbank et al. | |
| 5,529,235 A | 6/1996 | Boiarski et al. | |
| 5,535,934 A | 7/1996 | Boiarski et al. | |
| 5,535,937 A | 7/1996 | Boiarski et al. | |
| 5,540,375 A | 7/1996 | Bolanos et al. | |
| 5,540,706 A | 7/1996 | Aust et al. | |
| 5,542,594 A | 8/1996 | McKean et al. | |
| 5,549,637 A | 8/1996 | Crainich | |
| 5,553,675 A | 9/1996 | Pitzen et al. | |
| 5,562,239 A | 10/1996 | Boiarski et al. | |
| 5,564,615 A | 10/1996 | Bishop et al. | |
| 5,609,560 A | 3/1997 | Ichikawa et al. | |
| 5,626,587 A | 5/1997 | Bishop et al. | |
| 5,632,432 A | 5/1997 | Schulze et al. | |
| 5,645,209 A | 7/1997 | Green et al. | |
| 5,647,526 A | 7/1997 | Green et al. | |
| 5,653,374 A | 8/1997 | Young et al. | |
| 5,658,300 A | 8/1997 | Bito et al. | |
| 5,662,662 A | 9/1997 | Bishop et al. | |
| 5,667,517 A | 9/1997 | Hooven | |
| 5,693,042 A | 12/1997 | Boiarski et al. | |
| 5,704,534 A | 1/1998 | Huitema et al. | |
| 5,713,505 A | 2/1998 | Huitema | |
| 5,762,603 A | 6/1998 | Thompson | |
| 5,779,130 A | 7/1998 | Alesi et al. | |
| 5,782,396 A | 7/1998 | Mastri et al. | |
| 5,782,397 A | 7/1998 | Koukline | |
| 5,784,542 A | 7/1998 | Ohm et al. | |
| 5,792,573 A | 8/1998 | Pitzen et al. | |
| 5,797,536 A | 8/1998 | Smith et al. | |
| 5,797,900 A | 8/1998 | Madhani et al. | |
| 5,820,009 A | 10/1998 | Melling et al. | |
| 5,863,159 A | 1/1999 | Lasko | |
| 5,908,427 A | 6/1999 | McKean et al. | |
| 5,954,259 A | 9/1999 | Viola et al. | |
| 5,964,774 A | 10/1999 | McKean et al. | |
| 5,993,454 A | 11/1999 | Longo | |
| 6,010,054 A | 1/2000 | Johnson et al. | |
| 6,017,354 A | 1/2000 | Culp et al. | |
| 6,032,849 A | 3/2000 | Mastri et al. | |
| 6,045,560 A | 4/2000 | McKean et al. | |
| 6,090,123 A | 7/2000 | Culp et al. | |
| 6,126,651 A | 10/2000 | Mayer | |
| 6,129,547 A | 10/2000 | Cise et al. | |
| 6,165,169 A | 12/2000 | Panescu et al. | |
| 6,239,732 B1 | 5/2001 | Cusey | |
| 6,241,139 B1 | 6/2001 | Milliman et al. | |
| 6,264,086 B1 | 7/2001 | McGuckin, Jr. | |
| 6,264,087 B1 | 7/2001 | Whitman | |
| 6,302,311 B1 | 10/2001 | Adams et al. | |
| 6,315,184 B1 | 11/2001 | Whitman | |
| 6,321,855 B1 | 11/2001 | Barnes | |
| 6,329,778 B1 | 12/2001 | Culp et al. | |
| 6,343,731 B1 | 2/2002 | Adams et al. | |
| 6,348,061 B1 | 2/2002 | Whitman | |
| 6,368,324 B1 | 4/2002 | Dinger et al. | |
| 6,371,909 B1 | 4/2002 | Hoeg et al. | |
| 6,434,507 B1 | 8/2002 | Clayton et al. | |
| 6,443,973 B1 | 9/2002 | Whitman | |
| 6,451,027 B1 | 9/2002 | Cooper et al. | |
| 6,461,372 B1 | 10/2002 | Jensen et al. | |
| 6,488,197 B1 | 12/2002 | Whitman | |
| 6,491,201 B1 | 12/2002 | Whitman | |
| 6,533,157 B1 | 3/2003 | Whitman | |
| 6,537,280 B2 | 3/2003 | Dinger et al. | |
| 6,554,844 B2 | 4/2003 | Lee et al. | |
| 6,610,066 B2 | 8/2003 | Dinger et al. | |
| 6,611,793 B1 | 8/2003 | Burnside et al. | |
| 6,645,218 B1 | 11/2003 | Cassidy et al. | |
| 6,654,999 B2 | 12/2003 | Stoddard et al. | |
| 6,698,643 B2 | 3/2004 | Whitman | |
| 6,699,177 B1 | 3/2004 | Wang et al. | |
| 6,716,233 B1 | 4/2004 | Whitman | |
| 6,743,240 B2 | 6/2004 | Smith et al. | |
| 6,783,533 B2 | 8/2004 | Green et al. | |
| 6,792,390 B1 | 9/2004 | Burnside et al. | |
| 6,793,652 B1 | 9/2004 | Whitman et al. | |
| 6,817,508 B1 | 11/2004 | Racenet et al. | |
| 6,830,174 B2 | 12/2004 | Hillstead et al. | |
| 6,846,308 B2 | 1/2005 | Whitman et al. | |
| 6,846,309 B2 | 1/2005 | Whitman et al. | |
| 6,849,071 B2 | 2/2005 | Whitman et al. | |
| 6,860,892 B1 | 3/2005 | Tanaka et al. | |
| 6,899,538 B2 | 5/2005 | Matoba | |
| 6,905,057 B2 | 6/2005 | Swayze et al. | |
| 6,959,852 B2 | 11/2005 | Shelton, IV et al. | |
| 6,964,363 B2 | 11/2005 | Wales et al. | |
| 6,981,628 B2 | 1/2006 | Wales | |
| 6,981,941 B2 | 1/2006 | Whitman et al. | |
| 6,986,451 B1 | 1/2006 | Mastri et al. | |
| 6,988,649 B2 | 1/2006 | Shelton, IV et al. | |
| 7,032,798 B2 | 4/2006 | Whitman et al. | |
| RE39,152 E | 6/2006 | Aust et al. | |
| 7,055,731 B2 | 6/2006 | Shelton, IV et al. | |
| 7,059,508 B2 | 6/2006 | Shelton, IV et al. | |
| 7,077,856 B2 | 7/2006 | Whitman | |
| 7,111,769 B2 | 9/2006 | Wales et al. | |
| 7,122,029 B2 | 10/2006 | Koop et al. | |
| 7,140,528 B2 | 11/2006 | Shelton, IV | |
| 7,141,049 B2 | 11/2006 | Stern et al. | |
| 7,143,923 B2 | 12/2006 | Shelton, IV et al. | |
| 7,143,925 B2 | 12/2006 | Shelton, IV et al. | |
| 7,143,926 B2 | 12/2006 | Shelton, IV et al. | |
| 7,147,138 B2 | 12/2006 | Shelton, IV | |
| 7,172,104 B2 | 2/2007 | Scirica et al. | |
| 7,204,804 B2 | 4/2007 | Zirps et al. | |
| 7,225,964 B2 | 6/2007 | Mastri et al. | |

(56) References Cited

U.S. PATENT DOCUMENTS

| | | |
|---|---|---|
| 7,238,021 B1 | 7/2007 | Johnson |
| 7,246,734 B2 | 7/2007 | Shelton, IV |
| 7,252,660 B2 | 8/2007 | Kunz |
| 7,328,828 B2 | 2/2008 | Ortiz et al. |
| 7,364,061 B2 | 4/2008 | Swayze et al. |
| 7,380,695 B2 | 6/2008 | Doll et al. |
| 7,380,696 B2 | 6/2008 | Shelton, IV et al. |
| 7,404,508 B2 | 7/2008 | Smith et al. |
| 7,407,078 B2 | 8/2008 | Shelton, IV et al. |
| 7,416,101 B2 | 8/2008 | Shelton, IV et al. |
| 7,419,080 B2 | 9/2008 | Smith et al. |
| 7,422,139 B2 | 9/2008 | Shelton, IV et al. |
| 7,422,592 B2 | 9/2008 | Morley et al. |
| 7,431,189 B2 | 10/2008 | Shelton, IV et al. |
| 7,441,684 B2 | 10/2008 | Shelton, IV et al. |
| 7,448,525 B2 | 11/2008 | Shelton, IV et al. |
| 7,464,846 B2 | 12/2008 | Shelton, IV et al. |
| 7,464,847 B2 | 12/2008 | Viola et al. |
| 7,464,849 B2 | 12/2008 | Shelton, IV et al. |
| 7,481,347 B2 | 1/2009 | Roy |
| 7,481,824 B2 | 1/2009 | Boudreaux et al. |
| 7,487,899 B2 | 2/2009 | Shelton, IV et al. |
| 7,549,564 B2 | 6/2009 | Boudreaux |
| 7,565,993 B2 | 7/2009 | Milliman et al. |
| 7,568,603 B2 | 8/2009 | Shelton, IV et al. |
| 7,575,144 B2 | 8/2009 | Ortiz et al. |
| 7,588,175 B2 | 9/2009 | Timm et al. |
| 7,588,176 B2 | 9/2009 | Timm et al. |
| 7,637,409 B2 | 12/2009 | Marczyk |
| 7,641,093 B2 | 1/2010 | Doll et al. |
| 7,644,848 B2 | 1/2010 | Swayze et al. |
| 7,670,334 B2 | 3/2010 | Hueil et al. |
| 7,673,780 B2 | 3/2010 | Shelton, IV et al. |
| 7,699,835 B2 | 4/2010 | Lee et al. |
| 7,721,931 B2 | 5/2010 | Shelton, IV et al. |
| 7,738,971 B2 | 6/2010 | Swayze et al. |
| 7,740,159 B2 | 6/2010 | Shelton, IV et al. |
| 7,743,960 B2 | 6/2010 | Whitman et al. |
| 7,758,613 B2 | 7/2010 | Whitman |
| 7,766,210 B2 | 8/2010 | Shelton, IV et al. |
| 7,770,773 B2 | 8/2010 | Whitman et al. |
| 7,770,775 B2 | 8/2010 | Shelton, IV et al. |
| 7,793,812 B2 | 9/2010 | Moore et al. |
| 7,799,039 B2 | 9/2010 | Shelton, IV et al. |
| 7,802,712 B2 | 9/2010 | Milliman et al. |
| 7,803,151 B2 | 9/2010 | Whitman |
| 7,822,458 B2 | 10/2010 | Webster, III et al. |
| 7,845,534 B2 | 12/2010 | Viola et al. |
| 7,845,537 B2 | 12/2010 | Shelton, IV et al. |
| 7,857,185 B2 | 12/2010 | Swayze et al. |
| 7,870,989 B2 | 1/2011 | Viola et al. |
| 7,900,805 B2 | 3/2011 | Shelton, IV et al. |
| 7,905,897 B2 | 3/2011 | Whitman et al. |
| 7,918,230 B2 | 4/2011 | Whitman et al. |
| 7,922,061 B2 | 4/2011 | Shelton, IV et al. |
| 7,922,719 B2 | 4/2011 | Ralph et al. |
| 7,947,034 B2 | 5/2011 | Whitman |
| 7,951,071 B2 | 5/2011 | Whitman et al. |
| 7,954,682 B2 | 6/2011 | Giordano et al. |
| 7,959,051 B2 | 6/2011 | Smith et al. |
| 7,963,433 B2 | 6/2011 | Whitman et al. |
| 7,967,178 B2 | 6/2011 | Scirica et al. |
| 7,967,179 B2 | 6/2011 | Olson et al. |
| 7,992,758 B2 | 8/2011 | Whitman et al. |
| 8,011,550 B2 | 9/2011 | Aranyi et al. |
| 8,016,178 B2 | 9/2011 | Olson et al. |
| 8,016,855 B2 | 9/2011 | Whitman et al. |
| 8,020,743 B2 | 9/2011 | Shelton, IV |
| 8,025,199 B2 | 9/2011 | Whitman et al. |
| 8,035,487 B2 | 10/2011 | Malackowski |
| 8,052,024 B2 | 11/2011 | Viola et al. |
| 8,074,859 B2 | 12/2011 | Kostrzewski |
| 8,092,451 B2 | 1/2012 | Schechter et al. |
| 8,114,118 B2 | 2/2012 | Knodel et al. |
| 8,127,975 B2 | 3/2012 | Olson et al. |
| 8,132,705 B2 | 3/2012 | Viola et al. |
| 8,152,516 B2 | 4/2012 | Harvey et al. |
| 8,157,150 B2 | 4/2012 | Viola et al. |
| 8,157,151 B2 | 4/2012 | Ingmanson et al. |
| 8,182,494 B1 | 5/2012 | Yencho et al. |
| 8,186,555 B2 | 5/2012 | Shelton, IV et al. |
| 8,186,587 B2 | 5/2012 | Zmood et al. |
| 8,220,367 B2 | 7/2012 | Hsu |
| 8,235,273 B2 | 8/2012 | Olson et al. |
| 8,237,388 B2 | 8/2012 | Jinno et al. |
| 8,241,322 B2 | 8/2012 | Whitman et al. |
| 8,272,554 B2 | 9/2012 | Whitman et al. |
| 8,292,150 B2 | 10/2012 | Bryant |
| 8,292,888 B2 | 10/2012 | Whitman |
| 8,342,379 B2 | 1/2013 | Whitman et al. |
| 8,348,130 B2 | 1/2013 | Shah et al. |
| 8,348,855 B2 | 1/2013 | Hillely et al. |
| 8,353,440 B2 | 1/2013 | Whitman et al. |
| 8,357,144 B2 | 1/2013 | Whitman et al. |
| 8,365,633 B2 | 2/2013 | Simaan et al. |
| 8,365,972 B2 | 2/2013 | Aranyi et al. |
| 8,371,492 B2 | 2/2013 | Aranyi et al. |
| 8,372,057 B2 | 2/2013 | Cude et al. |
| 8,391,957 B2 | 3/2013 | Carlson et al. |
| 8,403,926 B2 | 3/2013 | Nobis et al. |
| 8,418,904 B2 | 4/2013 | Wenchell et al. |
| 8,424,739 B2 | 4/2013 | Racenet et al. |
| 8,454,585 B2 | 6/2013 | Whitman |
| 8,465,476 B2 | 6/2013 | Rogers et al. |
| 8,505,802 B2 | 8/2013 | Viola et al. |
| 8,517,241 B2 | 8/2013 | Nicholas et al. |
| 8,523,043 B2 | 9/2013 | Ullrich et al. |
| 8,551,076 B2 | 10/2013 | Duval et al. |
| 8,561,871 B2 | 10/2013 | Rajappa et al. |
| 8,561,874 B2 | 10/2013 | Scirica |
| 8,602,287 B2 | 12/2013 | Yates et al. |
| 8,623,000 B2 | 1/2014 | Humayun et al. |
| 8,627,995 B2 | 1/2014 | Smith et al. |
| 8,632,463 B2 | 1/2014 | Drinan et al. |
| 8,636,192 B2 | 1/2014 | Farascioni et al. |
| 8,636,766 B2 | 1/2014 | Milliman et al. |
| 8,647,258 B2 | 2/2014 | Aranyi et al. |
| 8,652,121 B2 | 2/2014 | Quick et al. |
| 8,657,174 B2 | 2/2014 | Yates et al. |
| 8,657,177 B2 | 2/2014 | Scirica et al. |
| 8,672,206 B2 | 3/2014 | Aranyi et al. |
| 8,696,552 B2 | 4/2014 | Whitman |
| 8,702,590 B2 | 4/2014 | Sholev |
| 8,708,213 B2 | 4/2014 | Shelton, IV et al. |
| 8,715,306 B2 | 5/2014 | Faller et al. |
| 8,758,391 B2 | 6/2014 | Swayze et al. |
| 8,806,973 B2 | 8/2014 | Ross et al. |
| 8,808,311 B2 | 8/2014 | Heinrich et al. |
| 8,820,605 B2 | 9/2014 | Shelton, IV |
| 8,851,355 B2 | 10/2014 | Aranyi et al. |
| 8,858,571 B2 | 10/2014 | Shelton, IV et al. |
| 8,875,972 B2 | 11/2014 | Weisenburgh, II et al. |
| 8,888,762 B2 | 11/2014 | Whitman |
| 8,893,946 B2 | 11/2014 | Boudreaux et al. |
| 8,899,462 B2 | 12/2014 | Kostrzewski et al. |
| 8,905,289 B2 | 12/2014 | Patel et al. |
| 8,919,630 B2 | 12/2014 | Milliman |
| 8,925,786 B2 | 1/2015 | Holsten et al. |
| 8,931,680 B2 | 1/2015 | Milliman |
| 8,939,344 B2 | 1/2015 | Olson et al. |
| 8,950,646 B2 | 2/2015 | Viola |
| 8,960,519 B2 | 2/2015 | Whitman et al. |
| 8,961,396 B2 | 2/2015 | Azarbarzin et al. |
| 8,967,443 B2 | 3/2015 | McCuen |
| 8,968,276 B2 | 3/2015 | Zemlok et al. |
| 8,968,337 B2 | 3/2015 | Whitfield et al. |
| 8,992,422 B2 | 3/2015 | Spivey et al. |
| 9,016,545 B2 | 4/2015 | Aranyi et al. |
| 9,023,014 B2 | 5/2015 | Chowaniec et al. |
| 9,033,868 B2 | 5/2015 | Whitman et al. |
| 9,055,943 B2 | 6/2015 | Zemlok et al. |
| 9,064,653 B2 | 6/2015 | Prest et al. |
| 9,072,515 B2 | 7/2015 | Hall et al. |
| 9,113,847 B2 | 8/2015 | Whitman et al. |

(56) References Cited

U.S. PATENT DOCUMENTS

| | | |
|---|---|---|
| 9,113,875 B2 | 8/2015 | Viola et al. |
| 9,113,876 B2 | 8/2015 | Zemlok et al. |
| 9,113,899 B2 | 8/2015 | Garrison et al. |
| 9,216,013 B2 | 12/2015 | Scirica et al. |
| 9,241,712 B2 | 1/2016 | Zemlok et al. |
| 9,282,961 B2 | 3/2016 | Whitman et al. |
| 9,282,963 B2 | 3/2016 | Bryant |
| 9,295,522 B2 | 3/2016 | Kostrzewski |
| 9,307,986 B2 | 4/2016 | Hall et al. |
| 9,937,626 B2 | 4/2018 | Rockrohr |
| 10,179,413 B2 | 1/2019 | Rockrohr |
| 10,321,964 B2 * | 6/2019 | Grover ................ A61B 34/35 |
| 10,537,713 B2 * | 1/2020 | Kidd ................ A61M 25/0113 |
| 2001/0031975 A1 | 10/2001 | Whitman et al. |
| 2002/0040217 A1 | 4/2002 | Jinno |
| 2002/0049454 A1 | 4/2002 | Whitman et al. |
| 2002/0165541 A1 | 11/2002 | Whitman |
| 2003/0038938 A1 | 2/2003 | Jung et al. |
| 2003/0165794 A1 | 9/2003 | Matoba |
| 2004/0034369 A1 | 2/2004 | Sauer et al. |
| 2004/0111012 A1 | 6/2004 | Whitman |
| 2004/0133189 A1 | 7/2004 | Sakurai |
| 2004/0153124 A1 | 8/2004 | Whitman |
| 2004/0176751 A1 | 9/2004 | Weitzner et al. |
| 2004/0193146 A1 | 9/2004 | Lee et al. |
| 2005/0125027 A1 | 6/2005 | Knodel et al. |
| 2005/0131442 A1 | 6/2005 | Yachia et al. |
| 2006/0079884 A1 | 4/2006 | Manzo et al. |
| 2006/0142656 A1 | 6/2006 | Malackowski et al. |
| 2006/0142740 A1 | 6/2006 | Sherman et al. |
| 2006/0142744 A1 | 6/2006 | Boutoussov |
| 2006/0235436 A1 | 10/2006 | Anderson et al. |
| 2006/0259073 A1 | 11/2006 | Miyamoto et al. |
| 2006/0278680 A1 | 12/2006 | Viola et al. |
| 2006/0284730 A1 | 12/2006 | Schmid et al. |
| 2007/0023476 A1 | 2/2007 | Whitman et al. |
| 2007/0023477 A1 | 2/2007 | Whitman et al. |
| 2007/0029363 A1 | 2/2007 | Popov |
| 2007/0084897 A1 | 4/2007 | Shelton et al. |
| 2007/0102472 A1 | 5/2007 | Shelton |
| 2007/0142969 A1 | 6/2007 | Devengenzo et al. |
| 2007/0152014 A1 | 7/2007 | Gillum et al. |
| 2007/0175947 A1 | 8/2007 | Ortiz et al. |
| 2007/0175949 A1 | 8/2007 | Shelton et al. |
| 2007/0175950 A1 | 8/2007 | Shelton et al. |
| 2007/0175951 A1 | 8/2007 | Shelton et al. |
| 2007/0175955 A1 | 8/2007 | Shelton et al. |
| 2007/0238925 A1 * | 10/2007 | Lee ................ A61B 34/37 600/106 |
| 2007/0270784 A1 | 11/2007 | Smith et al. |
| 2008/0029570 A1 | 2/2008 | Shelton et al. |
| 2008/0029573 A1 | 2/2008 | Shelton et al. |
| 2008/0029574 A1 | 2/2008 | Shelton et al. |
| 2008/0029575 A1 | 2/2008 | Shelton et al. |
| 2008/0039256 A1 | 2/2008 | Jinno et al. |
| 2008/0058801 A1 | 3/2008 | Taylor et al. |
| 2008/0103491 A1 | 5/2008 | Omori et al. |
| 2008/0109012 A1 | 5/2008 | Falco et al. |
| 2008/0110958 A1 | 5/2008 | McKenna et al. |
| 2008/0119870 A1 | 5/2008 | Williams |
| 2008/0147089 A1 | 6/2008 | Loh et al. |
| 2008/0167736 A1 | 7/2008 | Swayze et al. |
| 2008/0185419 A1 | 8/2008 | Smith et al. |
| 2008/0188841 A1 | 8/2008 | Tomasello et al. |
| 2008/0197167 A1 | 8/2008 | Viola et al. |
| 2008/0208195 A1 | 8/2008 | Shores et al. |
| 2008/0237296 A1 | 10/2008 | Boudreaux et al. |
| 2008/0245175 A1 | 10/2008 | Jinno et al. |
| 2008/0251561 A1 | 10/2008 | Eades et al. |
| 2008/0255413 A1 | 10/2008 | Zemlok et al. |
| 2008/0255607 A1 | 10/2008 | Zemlok |
| 2008/0262654 A1 | 10/2008 | Omori et al. |
| 2008/0308603 A1 | 12/2008 | Shelton et al. |
| 2009/0012533 A1 | 1/2009 | Barbagli et al. |
| 2009/0090763 A1 | 4/2009 | Zemlok et al. |
| 2009/0099876 A1 | 4/2009 | Whitman |
| 2009/0138006 A1 | 5/2009 | Bales et al. |
| 2009/0171147 A1 | 7/2009 | Lee et al. |
| 2009/0182193 A1 | 7/2009 | Whitman et al. |
| 2009/0209946 A1 | 8/2009 | Swayze et al. |
| 2009/0209990 A1 | 8/2009 | Yates et al. |
| 2009/0254094 A1 | 10/2009 | Knapp et al. |
| 2009/0299141 A1 | 12/2009 | Downey et al. |
| 2010/0016852 A1 | 1/2010 | Manzo et al. |
| 2010/0016853 A1 | 1/2010 | Burbank |
| 2010/0023022 A1 | 1/2010 | Zeiner et al. |
| 2010/0069942 A1 | 3/2010 | Shelton, IV |
| 2010/0125164 A1 | 5/2010 | LaBombard |
| 2010/0193568 A1 | 8/2010 | Scheib et al. |
| 2010/0211053 A1 | 8/2010 | Ross et al. |
| 2010/0225073 A1 | 9/2010 | Porter et al. |
| 2010/0228264 A1 | 9/2010 | Robinson et al. |
| 2010/0292708 A1 | 11/2010 | Madhani et al. |
| 2011/0071508 A1 | 3/2011 | Duval et al. |
| 2011/0077673 A1 | 3/2011 | Grubac et al. |
| 2011/0121049 A1 | 5/2011 | Malinouskas et al. |
| 2011/0125138 A1 | 5/2011 | Malinouskas et al. |
| 2011/0139851 A1 | 6/2011 | McCuen |
| 2011/0155783 A1 | 6/2011 | Rajappa et al. |
| 2011/0155786 A1 | 6/2011 | Shelton, IV |
| 2011/0172648 A1 | 7/2011 | Jeong |
| 2011/0174009 A1 | 7/2011 | Iizuka et al. |
| 2011/0174099 A1 | 7/2011 | Ross et al. |
| 2011/0184245 A1 | 7/2011 | Xia et al. |
| 2011/0204119 A1 | 8/2011 | McCuen |
| 2011/0218522 A1 | 9/2011 | Whitman |
| 2011/0276057 A1 | 11/2011 | Conlon et al. |
| 2011/0290854 A1 | 12/2011 | Timm et al. |
| 2011/0295242 A1 | 12/2011 | Spivey et al. |
| 2011/0295269 A1 | 12/2011 | Swensgard et al. |
| 2012/0000962 A1 | 1/2012 | Racenet et al. |
| 2012/0010616 A1 | 1/2012 | Huang et al. |
| 2012/0065470 A1 * | 3/2012 | Olds ................ A61B 34/30 901/41 |
| 2012/0074199 A1 | 3/2012 | Olson et al. |
| 2012/0080475 A1 | 4/2012 | Smith et al. |
| 2012/0080485 A1 | 4/2012 | Woodard, Jr. et al. |
| 2012/0089131 A1 | 4/2012 | Zemlok et al. |
| 2012/0104071 A1 | 5/2012 | Bryant |
| 2012/0116368 A1 | 5/2012 | Viola |
| 2012/0116416 A1 | 5/2012 | Neff et al. |
| 2012/0143002 A1 | 6/2012 | Aranyi et al. |
| 2012/0145427 A1 | 6/2012 | Fuchs |
| 2012/0168485 A1 | 7/2012 | Marczyk et al. |
| 2012/0172924 A1 | 7/2012 | Allen, IV |
| 2012/0199630 A1 | 8/2012 | Shelton, IV |
| 2012/0223121 A1 | 9/2012 | Viola et al. |
| 2012/0245428 A1 | 9/2012 | Smith et al. |
| 2012/0253329 A1 | 10/2012 | Zemlok et al. |
| 2012/0310220 A1 | 12/2012 | Malkowski et al. |
| 2012/0323226 A1 | 12/2012 | Chowaniec et al. |
| 2012/0330285 A1 | 12/2012 | Hartoumbekis et al. |
| 2013/0020376 A1 | 1/2013 | Shelton, IV et al. |
| 2013/0032629 A1 | 2/2013 | Viola |
| 2013/0093149 A1 | 4/2013 | Saur et al. |
| 2013/0131695 A1 | 5/2013 | Scarfogliero et al. |
| 2013/0158542 A1 | 6/2013 | Manzo et al. |
| 2013/0181035 A1 | 7/2013 | Milliman |
| 2013/0184704 A1 | 7/2013 | Beardsley et al. |
| 2013/0214025 A1 | 8/2013 | Zemlok et al. |
| 2013/0274722 A1 | 10/2013 | Kostrzewski et al. |
| 2013/0282052 A1 | 10/2013 | Aranyi et al. |
| 2013/0292451 A1 | 11/2013 | Viola et al. |
| 2013/0313304 A1 | 11/2013 | Shelton, IV et al. |
| 2013/0317486 A1 | 11/2013 | Nicholas et al. |
| 2013/0319706 A1 | 12/2013 | Nicholas et al. |
| 2013/0324978 A1 | 12/2013 | Nicholas et al. |
| 2013/0324979 A1 | 12/2013 | Nicholas et al. |
| 2013/0325095 A1 | 12/2013 | Ollivier |
| 2013/0331858 A1 | 12/2013 | Devengenzo et al. |
| 2013/0334281 A1 | 12/2013 | Williams |
| 2014/0005640 A1 | 1/2014 | Shelton, IV et al. |
| 2014/0012236 A1 | 1/2014 | Williams et al. |
| 2014/0012237 A1 | 1/2014 | Pribanic et al. |

(56) References Cited

U.S. PATENT DOCUMENTS

| | | |
|---|---|---|
| 2014/0012289 A1 | 1/2014 | Snow et al. |
| 2014/0025046 A1 | 1/2014 | Williams et al. |
| 2014/0110455 A1 | 4/2014 | Ingmanson et al. |
| 2014/0166023 A1 | 6/2014 | Kishi |
| 2014/0207125 A1 | 7/2014 | Applegate et al. |
| 2014/0207182 A1 | 7/2014 | Zergiebel et al. |
| 2014/0207185 A1 | 7/2014 | Goble et al. |
| 2014/0236174 A1 | 8/2014 | Williams et al. |
| 2014/0243849 A1* | 8/2014 | Saglam .................. A61B 34/75 606/130 |
| 2014/0276932 A1 | 9/2014 | Williams et al. |
| 2014/0299647 A1 | 10/2014 | Scirica et al. |
| 2014/0303668 A1 | 10/2014 | Nicholas et al. |
| 2014/0358129 A1 | 12/2014 | Zergiebel et al. |
| 2014/0361068 A1 | 12/2014 | Aranyi et al. |
| 2014/0365235 A1 | 12/2014 | DeBoer et al. |
| 2014/0373652 A1 | 12/2014 | Zergiebel et al. |
| 2014/0378761 A1 | 12/2014 | Zorn et al. |
| 2015/0014392 A1 | 1/2015 | Williams et al. |
| 2015/0048144 A1 | 2/2015 | Whitman |
| 2015/0076205 A1 | 3/2015 | Zergiebel |
| 2015/0080907 A1 | 3/2015 | Herrell et al. |
| 2015/0080912 A1 | 3/2015 | Sapre |
| 2015/0112381 A1 | 4/2015 | Richard |
| 2015/0122870 A1 | 5/2015 | Zemlok et al. |
| 2015/0133224 A1 | 5/2015 | Whitman et al. |
| 2015/0150547 A1 | 6/2015 | Ingmanson et al. |
| 2015/0150574 A1 | 6/2015 | Richard et al. |
| 2015/0157320 A1 | 6/2015 | Zergiebel et al. |
| 2015/0157321 A1 | 6/2015 | Zergiebel et al. |
| 2015/0164502 A1 | 6/2015 | Richard et al. |
| 2015/0201931 A1 | 7/2015 | Zergiebel et al. |
| 2015/0272577 A1 | 10/2015 | Zemlok et al. |
| 2015/0297199 A1 | 10/2015 | Nicholas et al. |
| 2015/0303996 A1 | 10/2015 | Calderoni |
| 2015/0320420 A1 | 11/2015 | Penna et al. |
| 2015/0327850 A1 | 11/2015 | Kostrzewski |
| 2015/0342601 A1 | 12/2015 | Williams et al. |
| 2015/0342603 A1 | 12/2015 | Zergiebel et al. |
| 2015/0374366 A1 | 12/2015 | Zergiebel et al. |
| 2015/0374370 A1 | 12/2015 | Zergiebel et al. |
| 2015/0374371 A1 | 12/2015 | Richard et al. |
| 2015/0374372 A1 | 12/2015 | Zergiebel et al. |
| 2015/0374449 A1 | 12/2015 | Chowaniec et al. |
| 2015/0380187 A1 | 12/2015 | Zergiebel et al. |
| 2016/0058513 A1 | 3/2016 | Giorgi et al. |
| 2016/0095585 A1 | 4/2016 | Zergiebel et al. |
| 2016/0095596 A1 | 4/2016 | Scirica et al. |
| 2016/0106406 A1 | 4/2016 | Cabrera et al. |
| 2016/0113648 A1 | 4/2016 | Zergiebel et al. |
| 2016/0113649 A1 | 4/2016 | Zergiebel et al. |
| 2016/0271368 A1* | 9/2016 | Falb .................. A61M 25/02 |
| 2017/0095299 A1 | 4/2017 | Hendrick |
| 2017/0159683 A1* | 6/2017 | Fiedler .................. E05C 1/14 |
| 2017/0258489 A1* | 9/2017 | Galili .................. A61M 25/0113 |
| 2017/0348060 A1 | 12/2017 | Blacker |
| 2018/0168746 A1* | 6/2018 | Swayze .................. A61B 17/3423 |
| 2018/0168748 A1 | 6/2018 | Kapadia |
| 2019/0000567 A1 | 1/2019 | Allen et al. |
| 2019/0021803 A1 | 1/2019 | Seow et al. |
| 2019/0223977 A1* | 7/2019 | Galili .................. A61H 39/08 |
| 2020/0315715 A1 | 10/2020 | Rockrohr et al. |

FOREIGN PATENT DOCUMENTS

| | | |
|---|---|---|
| CN | 1957854 A | 5/2007 |
| CN | 101495046 A | 7/2009 |
| CN | 102247182 A | 11/2011 |
| CN | 103732174 A | 4/2014 |
| CN | 105163685 A | 12/2015 |
| CN | 105611894 A | 5/2016 |
| DE | 102008053842 A1 | 5/2010 |
| EP | 0443576 A1 | 8/1991 |
| EP | 0705571 A1 | 4/1996 |
| EP | 1563793 A1 | 8/2005 |
| EP | 1769754 A1 | 4/2007 |
| EP | 2316345 A1 | 5/2011 |
| EP | 2668910 A2 | 12/2013 |
| EP | 3416582 A1 | 12/2018 |
| ES | 2333509 A1 | 2/2010 |
| JP | 2005125075 A | 5/2005 |
| KR | 20120022521 A | 3/2012 |
| WO | 2011016640 A2 | 2/2011 |
| WO | 2011108840 A2 | 9/2011 |
| WO | 2012040984 A1 | 4/2012 |
| WO | 2014126757 A2 | 8/2014 |
| WO | 2014162217 A1 | 10/2014 |
| WO | 2016043845 A1 | 3/2016 |
| WO | 2016051494 A1 | 4/2016 |
| WO | 2016205452 A1 | 12/2016 |
| WO | 2016209891 A1 | 12/2016 |
| WO | 2017151458 A1 | 9/2017 |
| WO | 2017205333 A1 | 11/2017 |

OTHER PUBLICATIONS

Supplementary European Search Report dated Sep. 16, 2021, issued in corresponding EP Appln. No. 19738784, 14 pages.
European Search Report dated Dec. 20, 2021, issued in corresponding EP Appln. No. 19738784, 14 pages.
Indian Office Action dated Jun. 7, 2022, issued in corresponding Indian Appln. No. 202017030959, 6 pages.
Extended European Search Report dated Jan. 18, 2023 corresponding to counterpart Patent Application EP 22204027.1.
Chinese First Office Action dated Feb. 27, 2023 corresponding to counterpart Patent Application CN 201980007946.1.
Chinese Office Action dated Aug. 28, 2023, issued in corresponding Chinese Appln. No. 201980007946, 12 pages.

* cited by examiner

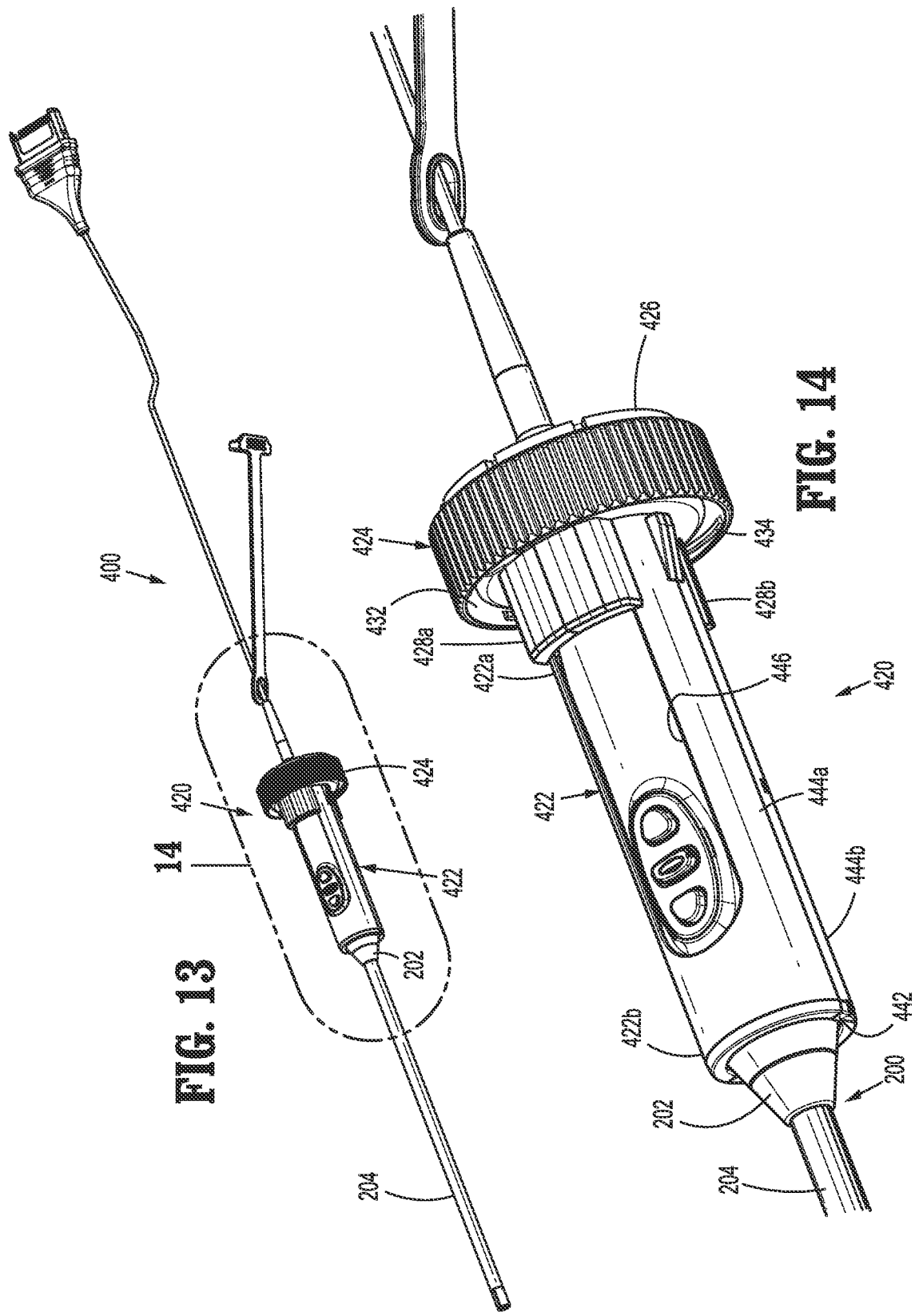

ROBOTIC SURGICAL ASSEMBLIES AND ADAPTER ASSEMBLIES THEREOF

This application is a continuation of U.S. application Ser. No. 16/961,321, filed Jul. 10, 2020, which is a National Stage Application of PCT Application No. PCT/US2019/012834 under 35 USC § 371(a), filed Jan. 9, 2019, which claims benefit of and priority to U.S. Provisional Patent Application Ser. No. 62/615,677 filed Jan. 10, 2018, the disclosures of each of the above-identified applications are hereby incorporated by reference in their entirety.

BACKGROUND

Robotic surgical systems have been used in minimally invasive medical procedures. Some robotic surgical systems included a console supporting a surgical robotic arm and a surgical instrument mounted to the robotic arm. The robotic arm provided mechanical power to the surgical instrument for its operation and movement. Each robotic arm may have included an instrument drive unit operatively connected to the surgical instrument.

During robotic surgeries, it may be useful to utilize endoscopes for viewing inside of a body cavity or organ. To implement the use of endoscopes in robotic surgeries, the robotic surgical system needs to be modified in such a way that will allow endoscopes to be interfaced with the various components of the robotic surgical system.

Accordingly, a need exists for a robotic surgical system capable of operating an endoscope.

SUMMARY

In accordance with an aspect of the present disclosure, an adapter assembly for connecting an endoscope to a robotic surgical system is provided. The adapter assembly includes a proximal housing, a distal housing, and a drive assembly. The proximal housing has a proximal portion and a distal portion. The proximal portion of the proximal housing is configured to be coupled to an instrument drive unit of a robotic surgical system. The distal portion of the proximal housing defines an opening therein. The distal housing includes a proximal portion and a distal portion. The proximal portion of the distal housing is rotatably received within the opening of the distal portion of the proximal housing. The distal portion of the distal housing defines a channel longitudinally therethrough that is configured for non-rotatable receipt of an endoscope. The drive assembly includes an input and an output. The input is configured to be operably coupled to a motor of the instrument drive unit. The output is operably coupled to the proximal portion of the distal housing to rotate the distal housing relative to the proximal housing.

In some embodiments, the drive assembly may include a drive shaft operably interconnecting the input of the drive assembly to the output of the drive assembly such that rotation of the input effects rotation of the output via the drive shaft. Each of the input and the output of the drive assembly may be a gear. The distal housing may include a ring gear non-rotatably disposed about the proximal portion of the distal housing. The ring gear may include teeth in operable engagement with the output of the drive assembly.

It is contemplated that the adapter assembly may include a pair of bearings. The pair of bearings may be longitudinally spaced from one another and disposed between an outer surface of the distal housing and an inner surface of the proximal housing to facilitate rotation of the distal housing relative to the proximal housing.

It is envisioned that the distal housing may include a first half section and a second half section removably connected to the first half section.

In some aspects of the present disclosure, the proximal housing may define an opening in the proximal portion thereof for passage of a cable of an endoscope.

In some embodiments, the proximal housing may define a pair of openings therein that are circumferentially spaced from one another.

It is contemplated that the distal housing may define an opening extending between an outer surface of the distal housing and an inner surface of the distal housing. The opening of the distal housing may be configured to align with control buttons of an endoscope upon receipt of the endoscope into the distal housing.

In another aspect of the present disclosure, a surgical assembly for interconnecting an endoscope and a surgical robotic arm is provided. The surgical assembly includes a surgical instrument holder and an adapter assembly. The surgical instrument holder is supported on a surgical robotic arm. The adapter assembly includes a proximal housing, a distal housing, and a drive assembly. The proximal housing has a proximal portion and a distal portion. The proximal portion of the proximal housing is configured to be coupled to an instrument drive unit of the surgical assembly. The distal portion of the proximal housing defines an opening therein. The distal housing includes a proximal portion and a distal portion. The proximal portion of the distal housing is rotatably received within the opening of the distal portion of the proximal housing. The distal portion of the distal housing defines a channel longitudinally therethrough that is configured for non-rotatable receipt of an endoscope. The drive assembly includes an input and an output. The input is configured to be operably coupled to a motor of the instrument drive unit. The output is operably coupled to the proximal portion of the distal housing to rotate the distal housing and the endoscope relative to the proximal housing.

In some embodiments, the surgical instrument holder may include a motor operably coupled to the instrument drive unit such that actuation of the motor of the surgical instrument holder effects rotation of each of the instrument drive unit, the proximal and distal housings of the adapter assembly, and the endoscope relative to the surgical instrument holder. The rotation of the endoscope caused by the motor of the surgical instrument holder may be at a slower rate than the rotation of the endoscope caused by the motor of the instrument drive unit.

In yet another aspect of the present disclosure, a method of assembling an endoscopic surgical assembly is provided. The method includes supporting a surgical instrument holder on a surgical robotic arm. The surgical instrument holder includes a motor. An instrument drive unit having a motor is provided, and the adapter assembly is provided. The method further includes supporting the instrument drive unit on the surgical instrument holder, coupling the proximal portion of the proximal housing to the instrument drive unit thereby operably coupling the input of the adapter assembly to the motor of the instrument drive unit, disposing a proximal portion of an endoscope within the channel defined in the distal housing of the adapter assembly, and actuating the motor of the instrument drive unit to effect rotation of the distal housing of the adapter assembly and the endoscope relative to the proximal housing of the adapter assembly.

In some embodiments, the method may further include actuating the motor of the surgical instrument holder thereby rotating each of the motor of the instrument drive unit, the proximal and distal housings of the adapter assembly, and the endoscope relative to the surgical instrument holder.

In yet another aspect of the present disclosure, an adapter assembly for connecting an endoscope to a robotic surgical system is provided. The adapter assembly includes a proximal housing, a distal housing, and a drive mechanism. The proximal housing is configured to be coupled to an instrument drive unit of a robotic surgical system. The distal housing includes a proximal portion and a distal portion. The proximal portion of the distal housing is rotatably connected to the proximal housing. The distal portion of the distal housing defines a channel longitudinally therethrough that is configured for non-rotatable receipt of an endoscope. The drive assembly includes an input configured to be operably coupled to a motor of an instrument drive unit of a robotic surgical system, and an output operably coupled to the distal housing to rotate the distal housing relative to the proximal housing.

In some embodiments, the adapter assembly may further include a latch pivotably connected to the proximal portion of the distal housing, and a lock connected to the proximal portion of the distal housing. The latch is configured to selectively connect to the lock for selectively retaining an endoscope within the adapter assembly.

It is contemplated that the distal housing may include an inner housing seated within the distal portion thereof. The inner housing may include a base that defines a bore therethrough. The bore is configured for receipt of an endoscope. The bore of the base may have a cone-shaped upper portion, and a cylindrical lower portion that extends distally from the cone-shaped upper portion.

In accordance with yet another aspect of the present disclosure, an adapter assembly for an endoscope is provided. The adapter assembly includes an elongate housing and a locking collar. The elongate housing defines a channel longitudinally therethrough that is configured for receipt of an endoscope. The locking collar includes an annular member non-rotatably connected to a proximal end of the elongate housing, and a surface feature extending distally from the annular member. The surface feature is configured for coupling the locking collar to a surgical robotic arm.

In some embodiments, the annular member may include a threaded inner surface configured to threadingly engage a surgical instrument holder.

It is contemplated that the elongate housing may be cylindrical and pliable to conform to an outer surface of a plurality of endoscopes.

It is envisioned that the surface feature of the locking collar may include two arcuate tabs that extend distally from the annular member.

In some embodiments, the elongate housing may include a first half section and a second half section removably connected to the first half section.

In another aspect of the present disclosure, a surgical assembly for interconnecting an endoscope and a surgical robotic arm is provided. The surgical assembly includes a surgical instrument holder and an adapter assembly. The surgical instrument holder is configured for engagement to a surgical robotic arm and includes an outer member and an inner member rotatably disposed within a channel of the outer member. The inner member defines a channel therethrough and a recess therein. The adapter assembly is configured for receipt within the channel of the inner member of the surgical instrument holder and includes an elongate housing and a locking collar. The elongate housing defines a channel longitudinally therethrough that is configured for receipt of an endoscope. The locking collar includes an annular member non-rotatably connected to a proximal end of the elongate housing, and a surface feature extending distally from the annular member. The surface feature is configured to be matingly received within the recess of the inner member of the surgical instrument holder such that the locking collar and the inner member of the surgical instrument holder are rotatable with one another.

In some embodiments, the annular member of the locking collar may include a threaded inner surface configured to threadingly engage a threaded outer surface of the inner member of the surgical instrument holder.

It is contemplated that the surface feature of the locking collar may include two arcuate tabs that extend distally from the annular member of the locking collar. The two arcuate tabs are configured for mating receipt within respective recesses of the surgical instrument holder.

It is envisioned that the surgical instrument holder may include a motor operably coupled to the inner member of the surgical instrument holder such that actuation of the motor rotates the inner member, the adapter assembly, and the endoscope. The surgical assembly may further include a drive assembly, which includes a pulley, a belt, and a ring gear. The pulley is rotatably disposed within the outer member and in operable engagement with the motor such that actuation of the motor rotates the pulley. The belt is rotatably disposed within the outer member and in operable engagement with the pulley such that rotation of the pulley effects rotation of the belt. The ring gear is non-rotatably disposed about the inner member and in operable engagement with the belt such that rotation of the belt effects rotation of the inner member. The belt may be a closed loop and may include teeth extending from an inner surface of the belt. The ring gear may have teeth extending from an outer surface thereof that are in operable engagement with the teeth of the belt.

Further details and aspects of exemplary embodiments of the present disclosure are described in more detail below with reference to the appended figures.

As used herein, the terms parallel and perpendicular are understood to include relative configurations that are substantially parallel and substantially perpendicular up to about + or −10 degrees from true parallel and true perpendicular.

BRIEF DESCRIPTION OF THE DRAWINGS

Embodiments of the present disclosure are described herein with reference to the accompanying drawings, wherein:

FIG. 13 is a perspective view of the adapter assembly of FIG. 12 coupled to the endoscope of FIG. 7;

FIG. 14 is an enlarged view of the adapter assembly of FIG. 13 having the endoscope coupled thereto;

DETAILED DESCRIPTION

Figure 1:
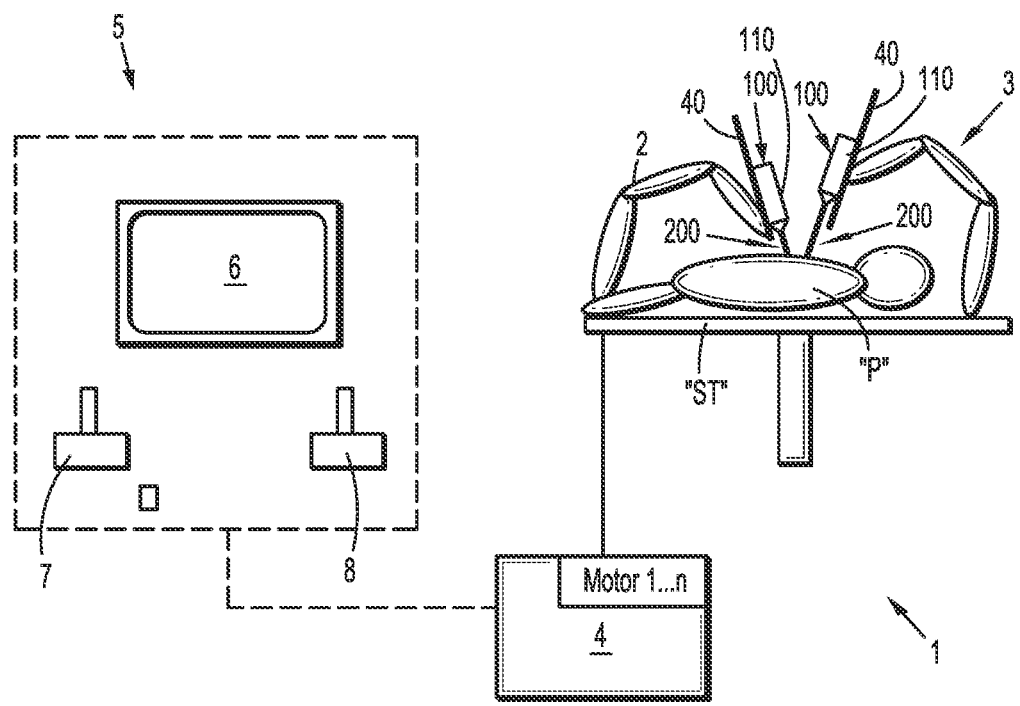
FIG. 1 is a schematic illustration of a robotic surgical system including a robotic surgical assembly in accordance with the present disclosure.

Embodiments of the presently disclosed surgical assembly including a surgical instrument holder, an instrument drive unit, an adapter assembly, and an endoscope, and methods thereof, are described in detail with reference to the drawings, in which like reference numerals designate identical or corresponding elements in each of the several views. As used herein the term "distal" refers to that portion of the surgical instrument holder, instrument drive unit, adapter assembly, and/or endoscope, that is closer to the patient, while the term "proximal" refers to that portion of the surgical instrument holder, instrument drive unit, adapter assembly, and/or endoscope, that is farther from the patient.

As will be described in detail below, provided is a robotic surgical system that includes a robotic surgical assembly, which is coupled with or to a robotic arm. The robotic surgical assembly generally includes a surgical instrument holder, an adapter assembly, which is coupled to the surgical instrument holder, and an endoscope, which is coupled to the adapter assembly. The endoscope may be rotated by actuation of a motor supported in the surgical instrument holder, which transfers its rotational motion to the adapter assembly and in turn the endoscope.

Referring initially to FIG. 1, a surgical system, such as, for example, a robotic surgical system 1, generally includes a plurality of surgical robotic arms 2, 3 having a robotic surgical assembly 100 including a surgical instrument, for example, endoscope 200 (FIG. 7) removably coupled to a slide rail 40 of surgical robotic arms 2, 3; a control device 4; and an operating console 5 coupled with control device 4.

Operating console 5 includes a display device 6, which is set up in particular to display three-dimensional images; and manual input devices 7, 8, by means of which a person (not shown), for example a surgeon, is able to telemanipulate robotic arms 2, 3 in a first operating mode, as known in principle to a person skilled in the art. Each of the robotic arms 2, 3 may be composed of a plurality of members, which are connected through joints. Robotic arms 2, 3 may be driven by electric drives (not shown) that are connected to control device 4. Control device 4 (e.g., a computer) may be set up to activate the drives, in particular by means of a computer program, in such a way that robotic arms 2, 3, the attached robotic surgical assembly 100, and thus surgical instrument, such as, for example, endoscope 200 execute a desired movement according to a movement defined by means of manual input devices 7, 8. Control device 4 may also be set up in such a way that it regulates the movement of robotic arms 2, 3.

Robotic surgical system 1 is configured for use on a patient "P" lying on a surgical table "ST" to be treated in a minimally invasive manner by means of a surgical instrument, e.g., endoscope 200. Robotic surgical system 1 may also include more than two robotic arms 2, 3, the additional robotic arms likewise being connected to control device 4 and being telemanipulatable by means of operating console 5. A surgical instrument, for example, endoscope 200, may also be attached to the additional robotic arm.

Control device 4 may control a plurality of motors, e.g., motors (Motor 1 . . . n), with each motor configured to drive movement of robotic arms 2, 3 in a plurality of directions. Further, control device 4 may control an individual motor 115 (FIG. 2) of an instrument drive unit 110 of robotic surgical assembly 100 that actuates a drive assembly 160 of an adapter assembly 120 to effect rotation of endoscope 200. In addition, control device 4 may control the operation of a rotation motor, such as, for example, a canister motor "M" (FIG. 2) of a surgical instrument holder or holder 102, configured to drive a relative rotation of motor assembly 114 of instrument drive unit 110 and in turn adapter assembly 120 and endoscope 200, as will be described in detail below. In embodiments, each motor of the instrument drive unit 110 can be configured to actuate a drive rod/cable or a lever arm to effect operation and/or movement of an electromechanical surgical instrument (not shown).

For a detailed discussion of the construction and operation of a robotic surgical system, reference may be made to U.S. Patent Application Publication No. 2012/0116416, filed on Nov. 3, 2011, entitled "Medical Workstation," the entire contents of which are incorporated by reference herein.

Figure 2:
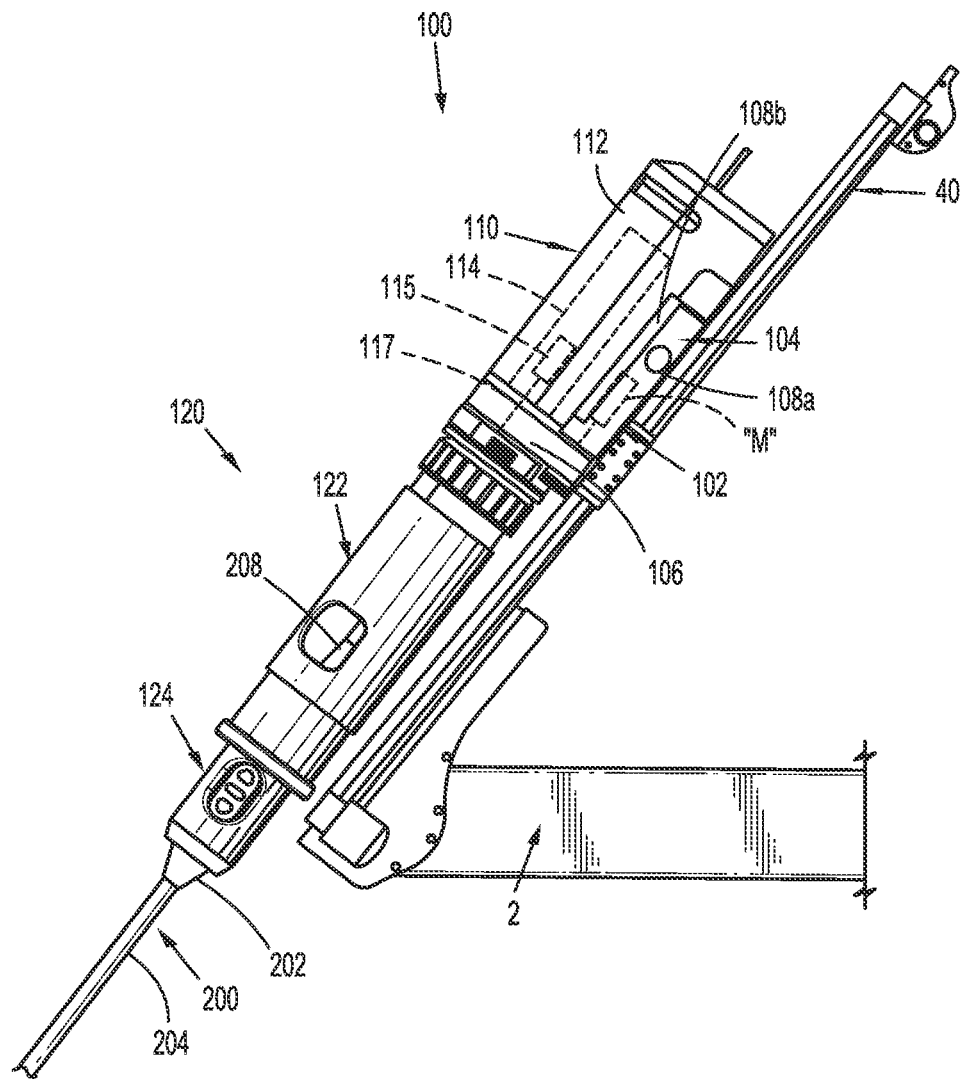
FIG. 2 is a side, perspective view of the surgical assembly of FIG. 1 including a surgical instrument holder, an instrument drive unit, an adapter assembly, and an endoscope.
Figure 3:
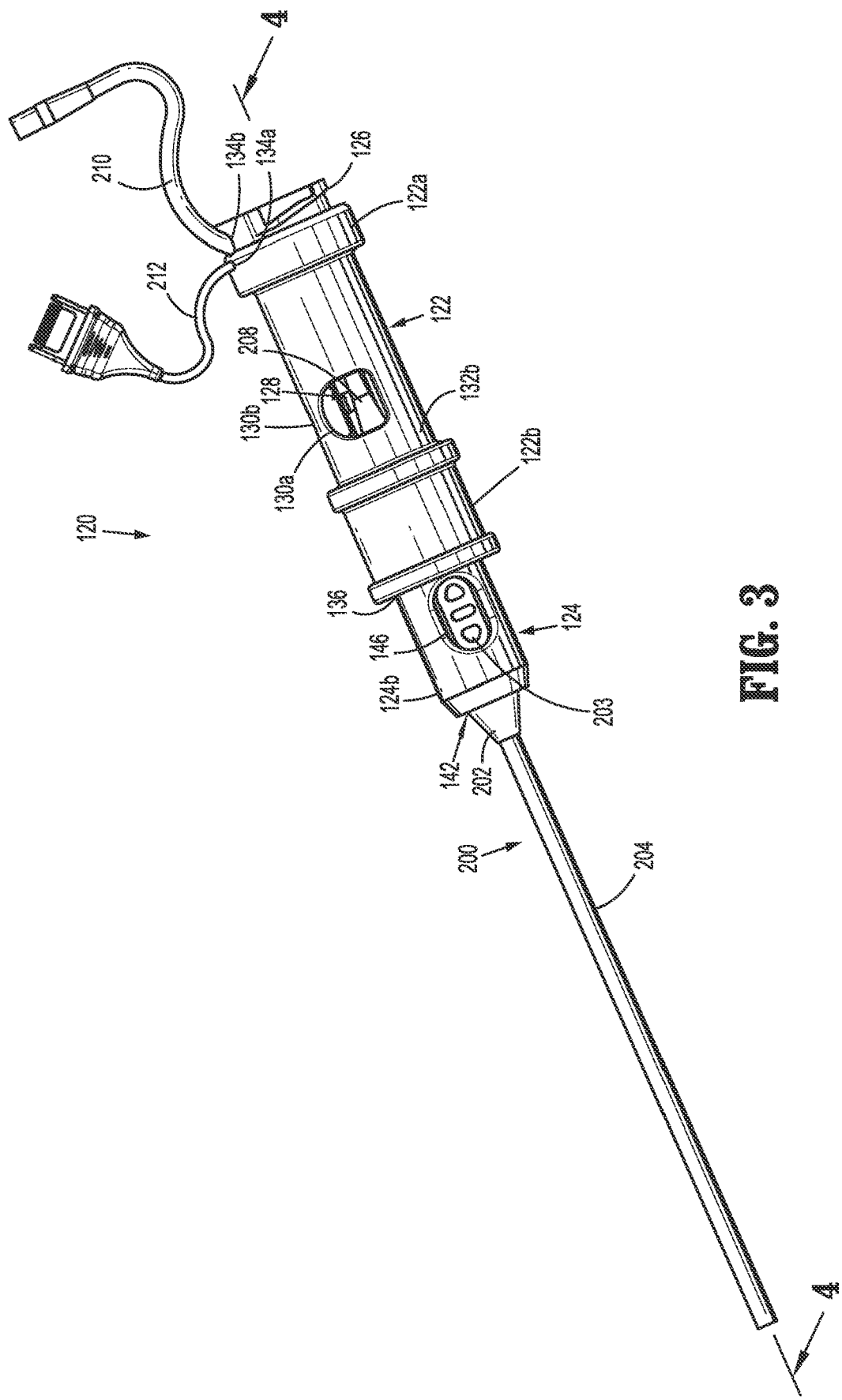
FIG. 3 is a side, perspective view of the adapter assembly of FIG. 2 coupled to the endoscope of FIG. 2.

With reference to FIGS. 1 and 2, robotic surgical system 1 includes the robotic surgical assembly 100, which is coupled with or to robotic arm 2 or 3. The robotic surgical assembly 100 includes the surgical instrument holder 102, the instrument drive unit 110, the adapter assembly 120, and the endoscope 200. Instrument drive unit 110 transfers power and actuation forces from a motor 115 thereof to a drive assembly 160 (See FIG. 5) of adapter assembly 120 to drive a rotation of endoscope 200 up to least about 180 degrees about its longitudinal axis "X." Endoscope 200 may be rotated at least an additional 180 degrees by actuation of motor "M" supported in surgical instrument holder 102, which transfers its rotational motion to adapter assembly 120 and in turn to endoscope 200. As such, surgical assembly 100 provides two mechanical pathways to adjust the rotational position of endoscope 200, with each mechanical pathway resulting in a different rate of rotation of endoscope 200, as will be described below.

With reference to FIG. 2, surgical instrument holder 102 of surgical assembly 100 functions to support instrument drive unit 110 and to actuate a rotation of motor assembly 114 of instrument drive unit 110. Surgical instrument holder 102 includes a back member or carriage 104, and an outer member or housing 106 extending laterally (e.g., perpendicularly) from an end of carriage 104. In some embodiments, housing 106 may extend at various angles relative to carriage 104 and from various portions of carriage 104. Carriage 104 has a first side 108a and a second side 108b, opposite first side 108a. First side 108a of carriage 104 is detachably connectable to rail 40 of robotic arm 2 and enables surgical instrument holder 102 to slide or translate along rail 40 of robotic arm 2. Second side 108b of carriage 104 is configured to non-rotatably support a housing or outer shell 112 of instrument drive unit 110.

Carriage 104 of surgical instrument holder 102 supports or houses a motor, such as, for example, canister motor "M" therein. Motor "M" receives controls and power from control device 4 to ultimately rotate internal motor assembly 114 of instrument drive unit 110. In some embodiments, carriage 104 may include a printed circuit board (not shown) in electrical communication with motor "M" to control an operation of motor "M" of carriage 104. Carriage 104 has a rotatable drive shaft (not shown) extending from motor "M" and longitudinally through carriage 104. The drive shaft of carriage 104 has a gear or coupling member (not shown) configured for operable engagement with a gear or coupling member (not shown) of motor assembly 114 of instrument drive unit 110 to transfer a rotation from motor "M" of surgical instrument holder 102 to motor assembly 114 of instrument drive unit 110, as will be described in detail below. In some embodiments, motor "M" of surgical instrument holder 102 may drive the rotation of motor assembly 114 of instrument drive unit 110 by any suitable drive mechanism, for example, a gear assembly, a rack and pinion, pulley friction drive, hydraulics, pneumatics, a cable, belt, or the like.

Housing 106 of surgical instrument holder 102 defines a channel (not shown) therethrough configured to rotatably receive and support instrument drive unit 110 therein. Housing 106 has a generally oblong semicircular shape, but in some embodiments, housing 106 may assume a variety of shapes, such as, for example, C-shaped, U-shaped, V-shaped, hook-shaped, or the like.

With continued reference to FIG. 2, instrument drive unit 110 of surgical assembly 100 includes an outer housing 112 and an inner housing or motor assembly 114 rotatably disposed within outer housing 112. Outer housing 112 is engaged to second side 108b of carriage 104 of surgical instrument holder 102 and houses various components of instrument drive unit 110. In some embodiments, outer housing 112 may be permanently or removably attached to second side 108b of carriage 104. Outer housing 112 of instrument drive unit 110 has a generally cylindrical configuration, but in some embodiments, outer housing 112 may assume a variety of configurations, such as, for example, squared, elongate, tubular, or the like.

Outer housing 112 of instrument drive unit 110 is configured and dimensioned to receive motor assembly 114, a motor pack or the like therein. Upon coupling instrument drive unit 110 to surgical instrument holder 102, a drive assembly (not shown) of surgical instrument holder 102 operably engages motor assembly 114 of instrument drive unit 110 such that actuation of motor "M" of surgical instrument holder 102 effects a rotation of motor assembly 114 within outer housing 112 of instrument drive unit 110. For example, it is contemplated that the gear of drive shaft (not shown) extending from motor "M" of surgical instrument holder 102 is in operable engagement with a toothed inner or outer surface (not shown) of motor assembly 114 such that rotation of the gear attached to motor "M" of surgical instrument holder 102 rotates motor assembly 114. In some embodiments, surgical instrument holder 102 may have a pulley system that transfers rotational forces output by motor "M" of surgical instrument holder 102 into rotation of motor assembly 114. It is envisioned that any suitable mechanism may be provided to transfer the rotational forces output by motor "M" of surgical instrument holder 102 into a rotation of motor assembly 114.

Motor assembly 114 may include four motors, for example, canister motors or the like, each having a drive shaft (not explicitly shown) having a non-circular transverse cross-sectional profile (e.g., substantially D-shaped, or the like). In some embodiments, the drive shaft may have a circular transverse cross-sectional profile. The four motors are arranged in a rectangular formation such that respective drive shafts thereof are all parallel to one another and all extending in a common direction. A drive shaft 117 of one motor 115 of motor assembly 114 has a drive coupler, such as, for example, a crown gear (not shown) configured to operably couple to drive assembly 160 (See FIG. 5) of adapter assembly 120. As motor 115 of motor assembly 114 is actuated, rotation of drive shaft 117 of motor 115 is transferred to drive assembly 160 of adapter assembly 120 to ultimately rotate endoscope 200 about its longitudinal axis "X," as will be described below.

With reference to FIGS. 2-6, surgical assembly 100 includes the adapter assembly 120 that selectively intercouples instrument drive unit 110 and endoscope 200 to transfer rotational motion originating from instrument drive unit 110 into rotational motion of endoscope 200 about its longitudinal axis "X." Adapter assembly 120 generally includes a proximal housing 122, a distal housing 124 rotatably coupled to proximal housing 122, and a drive assembly 160 disposed within proximal housing 122 and configured to rotate distal housing 124 relative to proximal housing 122.

Proximal housing 122 of adapter assembly 120 has an elongate tubular configuration and has a proximal portion 122a and a distal portion 122b. Proximal portion 122a of proximal housing 122 has a mechanical interface, such as, for example, a female or male mating feature 126, configured to non-rotatably couple to a corresponding mating feature (not shown) of motor assembly 114 of instrument drive unit 110. As such, when adapter assembly 120 is coupled to instrument drive unit 110, a rotation of motor assembly 114 of instrument drive unit 110 results in a rotation of adapter assembly 120 and any surgical instrument attached thereto.

Proximal portion 122a of proximal housing 122 has a hollow interior 128 for the passage of various cables of an endoscope. Proximal portion 122a of proximal housing 122 defines a pair of openings 130a, 130b that extend from an inner surface 132a to an outer surface 132b thereof. Openings 130a, 130b are circumferentially spaced from one another and are each configured as access holes for receipt of a finger of a clinician. In this way, a clinician can access the hollow interior 128 of proximal housing 122 using, for example, his or her thumb and pointer finger to pinch a cable coupling 206 or 208 of endoscope 200 to selectively decouple cable coupling 206 or 208 or attach cable coupling 206 or 208 from/to endoscope 200. This allows for the removal of cable couplings 206, 208 of endoscope 200 prior to autoclaving, servicing, or generally assembly of adapter assembly 120 or endoscope 200.

Proximal portion 122a of proximal housing 120 defines another pair of openings 134a, 134b that extend between inner and outer surfaces 132a, 132b. Openings 134a, 134b are configured for the passage of cables, for example, a light or fiber optic cable 210 and a communications cable 212 of endoscope 200, from hollow interior 128 of proximal housing 122 to an exterior of proximal housing 122 of adapter assembly 120. In some embodiments, proximal portion 122a may have more than two openings for the passage of cables, or only one opening for the passage of one cable.

Distal portion 122b of proximal housing 122 defines a distal opening 136 therethrough that is in line with a longitudinal axis defined by proximal housing 122. Distal portion 122b of proximal housing 122 defines a pair of annular cutouts 138a, 138b formed in inner surface 132a thereof. Annular cutouts 138a, 138b are longitudinally spaced from one another and rotatably retain respective first and second bearings 140a, 140b of drive assembly 160. In some embodiments, first and second bearings 140a, 140b may be substituted with bushings.

With reference to FIGS. 3-6, distal housing 124 of adapter assembly 120 has a proximal portion 124a rotatably received in distal opening 136 of proximal housing 122, and a distal portion 124b. Proximal portion 124a of distal housing 124 has the first and second bearings 140a, 140b disposed thereabout. As such, first and second bearings 140a, 140b are disposed between inner surface 132a of proximal housing 122 and an outer surface of distal housing 124 to facilitate rotation of distal housing 124 relative to proximal housing 122. Distal housing 124 of adapter assembly 120 has a generally elongated tubular configuration and defines a channel 142 longitudinally therethrough. Channel 142 is configured to non-rotatably receive and retain a proximal portion 202 (e.g., a handle portion) of endoscope 200.

Distal housing 124 of adapter assembly 120 includes a first half section 144a and a second half section 144b. First and second half sections 144a, 144b of distal housing 124 are removably connected to one another so that proximal portion 202 of endoscope 200 may be encapsulated by distal housing 124 when first and second half sections 144a, 144b are connected to one another, and removed from or inserted within distal housing 124 when first and second half sections 144a, 144b of distal housing 124 are disconnected from one another. Upon connecting endoscope 200 to distal housing 124, endoscope 200 is fixed therein and not easily removable. In some embodiments, distal housing 124 may be monolithically formed from a pliable material that conforms to proximal portion 202 of endoscope 200 such that endoscope 200 can be selectively inserted into or removed from distal housing 124. Distal housing 124 defines an opening 146 extending between an inner surface 148a and an outer surface 148b thereof. Opening 146 of distal housing 124 has an elliptical shape and is configured to align with control buttons 203 on proximal portion 202 of endoscope 200 upon receipt of endoscope 200 into distal housing 124.

Distal housing 124 has a ring gear 150 non-rotatably disposed about proximal portion 124a thereof. Ring gear 150 has teeth 152 extending radially from a periphery thereof that operably engage teeth of a gear 176 (FIG. 6) of drive assembly 160, as will be described in detail below. In some embodiments, ring gear 150 may be secured to a top surface of distal housing 124 instead of being non-rotatably disposed about outer surface 148b of distal housing 124. It is further contemplated that teeth 152 of ring gear 150 extend inwardly instead of radially outward.

Figure 4:
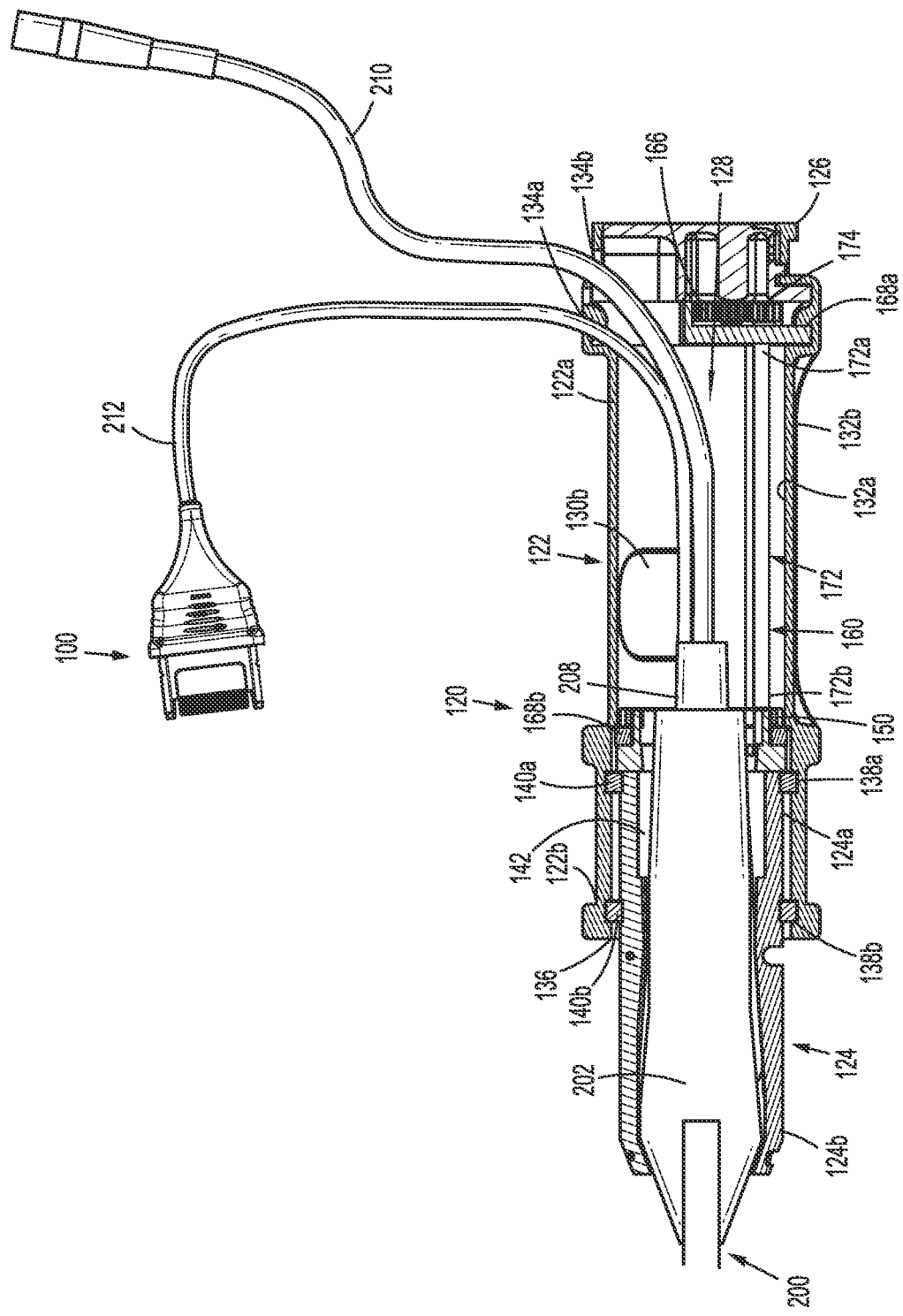
FIG. 4 is a partial cross-sectional view, taken along lines 4-4 of FIG. 3, of the adapter assembly.
Figure 5:
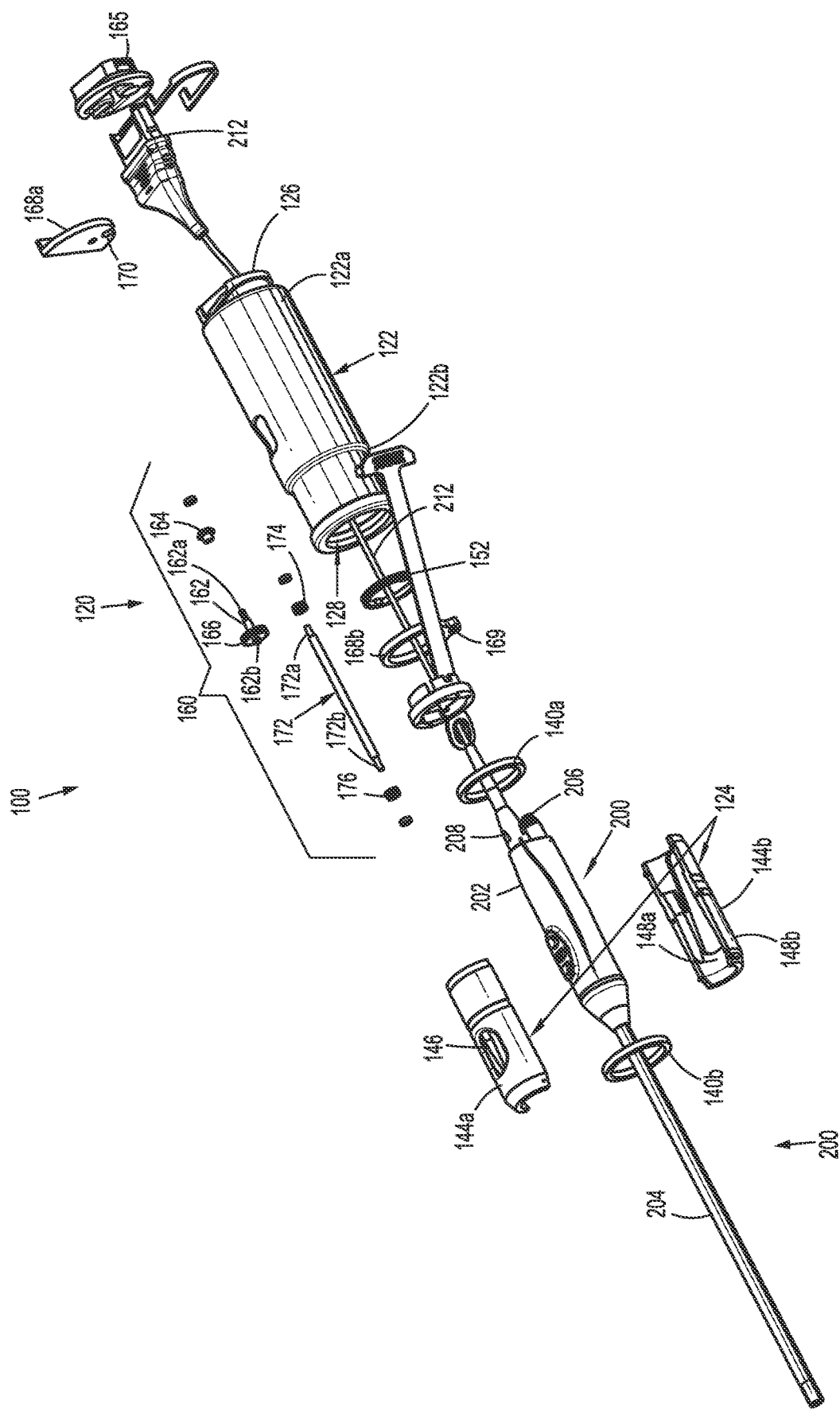
FIG. 5 is a perspective view, with parts separated, of the adapter assembly and the endoscope of FIG. 3.
Figure 6:
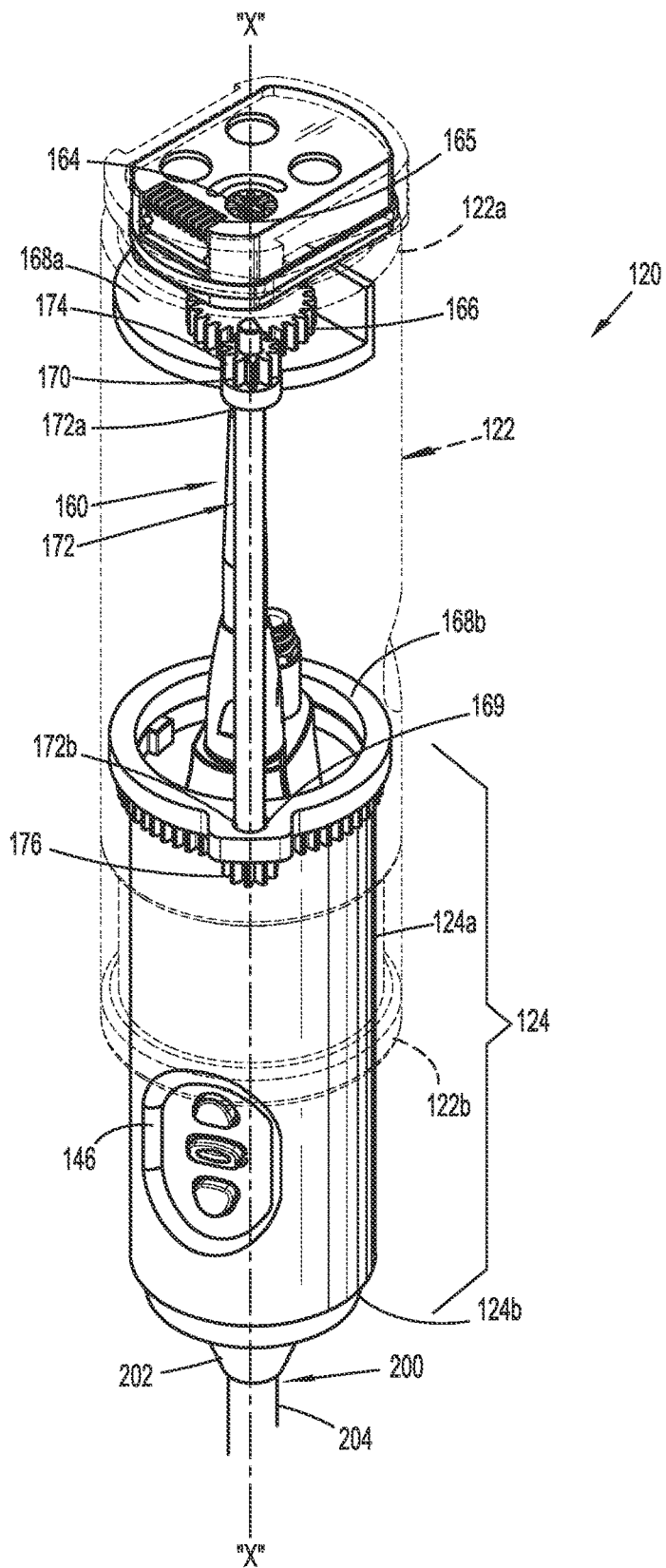
FIG. 6 is a perspective view of the adapter assembly of FIG. 3, illustrating a proximal housing, in transparent form, a distal housing, and a drive assembly.

With reference to FIGS. 4-6, drive assembly 160 of adapter assembly 120 is configured to transfer rotation of drive shaft 117 (FIG. 2) of instrument drive unit 110 into rotation of distal housing 124 of adapter assembly 120 relative to proximal housing 122 of adapter assembly 120. Drive assembly 160 includes a first drive shaft 162 having a proximal end 162a and a distal end 162b. Proximal end 162a of first drive shaft 160 has an input 164 configured for detachable operable engagement with the gear (not shown) of drive shaft 117 (FIG. 2) of motor 115 of instrument drive unit 110 such that actuation of motor 115 of instrument drive unit 110 results in rotation of first drive shaft 162 of drive assembly 160. Input 164 of drive assembly 160 is in the form of a gear, such as, for example, a crown gear. Distal end 162b of first drive shaft 162 has a gear, such as, for example, a spur gear 166 that is rotatably supported on a proximal mounting plate 168a of proximal housing 122. Proximal mounting plate 168a is fixed within proximal portion 122a of proximal housing 122 and is prevented from rotating therein. Proximal mounting plate 168a defines a bore 170 therethrough. Proximal mounting plate 168 has a robotic system identification connector 165 that interfaces with a corresponding connector (not shown) of instrument drive unit 110. Connector 165 of adapter assembly 120 may be a magnetic, resistive or digital interface for identification, use, and/or life management, which can be read by a surgical system and/or feedback display.

Drive assembly 160 includes a second drive shaft 172 extending longitudinally through hollow interior 128 of proximal housing 122 and is laterally offset from first drive shaft 162. Second drive shaft 172 has a proximal end 172a extending through bore 170 of proximal mounting plate 168a, and a distal end 172b extending through a bore 169 of a distal mounting plate 168b, located distally from proximal mounting plate 168a. Distal mounting plate 168b, similar to proximal mounting plate 168a, is fixed within proximal housing 122 and prevented from rotating therein. Proximal end 172a of second drive shaft 172 has a gear, such as, for example, a spur gear 174, in operable engagement with spur gear 166 of first drive shaft 162 such that rotation of first drive shaft 162 results in rotation of second drive shaft 172. Distal end 172b of second drive shaft 172 has an output 176 in the form of a gear in operable engagement with teeth 152 of ring gear 150 of distal housing 124 such that rotation of second drive shaft 172 results in rotation of distal housing 124 relative to proximal housing 122.

It is contemplated that drive assembly 160 of adapter assembly 120 may be substituted with any suitable mechanism that transfers rotational motion originating from motor 115 of instrument drive unit 110 into rotation of distal housing 124 of adapter assembly 120 relative to proximal housing 122 of adapter assembly 120.

Figure 7:
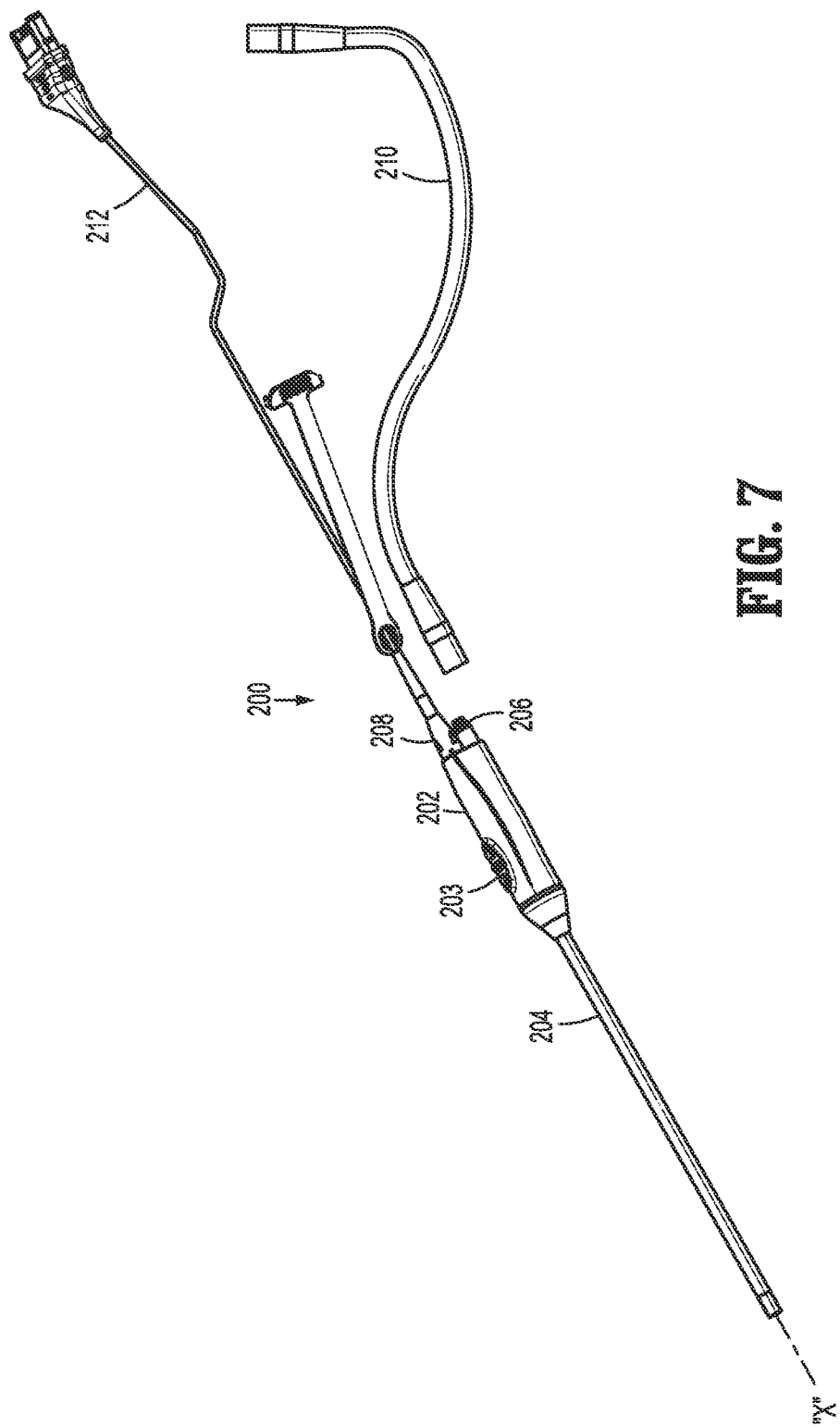
FIG. 7 is a perspective view of the endoscope of the surgical assembly of FIG. 2.
Figure 8:
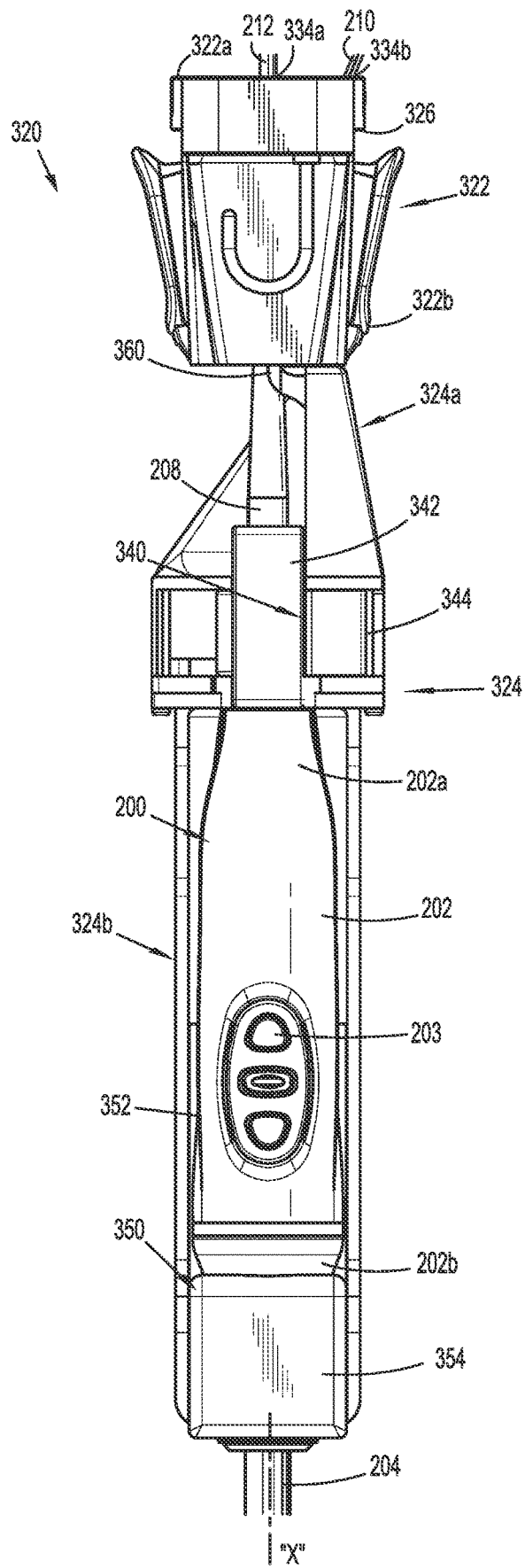
FIG. 8 is a front view, partially broken away, of another embodiment of an adapter assembly for interconnecting the instrument drive unit of FIG. 2 and the endoscope of FIG. 7.

With reference to FIG. 7, surgical assembly 100 includes an endoscope, such as, for example, a standalone endoscope 200. It is contemplated that a plurality of different types of endoscopes may be able to fit within distal housing 124 of adapter assembly 120 other than endoscope 200 illustrated in FIG. 7. Alternately, it is contemplated that a variety of different distal housings 124 for adapter assembly 120 may be available or provided which are specifically configured to interconnect a specific endoscope to robotic surgical system 1. Endoscope 200 generally includes a proximal portion 202 having manual control buttons 203, and an endoscopic tube housing 204 extending distally from proximal portion 202. Endoscope 200 may further include a light source coupling 206 and a communications and power coupling 208. Light source coupling 206 is configured for detachable engagement of a light source cable 210. Communications and power coupling 208 is configured for detachable engagement of a communications cable 212.

In operation, carriage 104 of surgical instrument holder 102 is attached to rail 40 of robotic arm 2 (FIG. 2). Instrument drive unit 110 is positioned within the channel (not shown) of surgical instrument holder 102 and supported on side 108b of carriage 104 of surgical instrument holder 102. Proximal portion 122a of proximal housing 122 of adapter assembly 120 is non-rotatably coupled to motor assembly 114 of instrument drive unit 110 and motor 115 of instrument drive unit 110 is operably coupled to input 164 of drive assembly 160 of adapter assembly 120. Cables 210, 212 of endoscope 200 are guided through hollow interior 128 of proximal housing 122 of adapter assembly 120 and out through openings 134a, 134b of proximal housing 122 of adapter assembly 122, and proximal portion 202 of endoscope 200 is secured within distal housing 124 of adapter assembly 120. With proximal portion 202 of endoscope 200 retained within distal housing 124 of adapter assembly 120, endoscope 200 may be manipulated, for example, rotated, to a selected rotational position about its longitudinal axis "X."

In particular, endoscope 200 may be rotated at a first rate or a second rate, slower than the first rate, depending on how precise the clinician needs to be with positioning the endoscope 200 in a surgical site. To move endoscope 200 at the faster rate, a clinician operating manual input devices 7, 8 of surgical system 1, may actuate motor 115 of motor assembly 114 of instrument drive unit 110. Actuation of motor 115 of instrument drive unit 110 rotates the gear (not shown) thereof, which rotates input 164 of drive assembly 160 of adapter assembly 120 due to input 164 of drive assembly 160 being operably engaged to the gear of instrument drive unit 110. Rotation of input 164 rotates first drive shaft 162 of drive assembly 160, and in turn rotates second drive shaft 172 of drive assembly 160 due to gears 166, 174 of respective first and second drive shafts 162, 172 being in meshing engagement. Since gear 174 of second drive shaft 172 is in operable engagement with ring gear 150 of distal housing 124, rotation of second drive shaft 172 of drive assembly 160 effects rotation of distal housing 124 relative to proximal housing 122. With endoscope 200 retained within distal housing 124, endoscope 200 rotates about its longitudinal axis "X" as distal housing 124 rotates. It is contemplated that by actuating motor 115 of motor assembly 114, distal housing 124 and endoscope 200 can be rotated up to about 180 degrees, in either direction, relative to proximal housing 122.

To move endoscope 200 at the second, slower rate, a clinician operating manual input devices 7, 8 of surgical system 1, may actuate motor "M" of surgical instrument holder 102. Actuation of motor "M" of surgical instrument holder 102 drives a rotation of the motor shaft (not shown) thereof, which transfers its rotational motion to motor assembly 114 of instrument drive unit 110. Since motor assembly 114 of instrument drive unit 110 is non-rotatably connected to proximal portion 122a of proximal housing 122 of adapter assembly 120, rotation of motor assembly 114 of instrument drive unit 110 causes proximal housing 122 of adapter assembly 120 to rotate and in turn rotates distal housing 124 of adapter assembly 120 and endoscope 200 about its longitudinal axis "X." It is contemplated that distal housing 124 of adapter assembly 120 and endoscope 200 can be rotated up to about 180 degrees, in either direction, by motor "M" of surgical instrument holder 102. In some embodiments, endoscope 200 may be moved at the first, faster rate via the actuation of motor "M" of surgical instrument holder 102 rather than the actuation of motor 115 of instrument drive unit 110, and endoscope 200 may be moved at the second, slower rate via the actuation of motor 115 of instrument drive unit 110 rather than motor "M" of surgical instrument holder 102.

In addition to endoscope 200 being rotatable at two rates by adapter assembly 120, adapter assembly 120 may include a mechanical feature (not shown) used to increase the rotational angle while maintaining the clocking position of cables 210, 212 and buttons 203 of endoscope 200.

With reference to FIGS. 8-11, another embodiment of an adapter assembly 320 is provided, similar to adapter assembly 120 described above with reference to FIGS. 2-6. Adapter assembly 320 selectively intercouples instrument drive unit 110 (FIG. 2) and an endoscope, for example, endoscope 200 (FIG. 7), to transfer rotational motion originating from instrument drive unit 110 into rotational motion of endoscope 200 about its longitudinal axis "X." Adapter assembly 320 generally includes a proximal housing 322, a distal housing 324 rotatably coupled to proximal housing 322, and a drive assembly 360 disposed within proximal housing 322 and configured to rotate distal housing 324 relative to proximal housing 322.

In some embodiments, the endoscope 200 may be rotated in such a manner that the cables 210, 212 thereof do not swing close to the rail 40.

Proximal housing 322 of adapter assembly 320 has a mechanical interface, such as, for example, a female or male mating feature 326, configured to non-rotatably couple to a corresponding mating feature (not shown) of motor assembly 114 (FIG. 2) of instrument drive unit 110. As such, when adapter assembly 320 is coupled to instrument drive unit 110, a rotation of motor assembly 114 of instrument drive unit 110 results in a rotation of adapter assembly 320 and any surgical instrument attached thereto, for example, endoscope 200. A proximal end 322a of proximal housing 322 has a plurality of openings 334a, 334b defined therein configured for passage of proximal ends of a light cable 212 and a communications cable 210 of endoscope 200. Proximal housing 322 has a wire holder 323 configured to store cables 210, 212 of endoscope 200 therein when cables 210, 212 are not passed through openings 334a, 334b.

Distal housing 324 has a proximal portion 324a and a distal portion 324b. Proximal portion 324a of distal housing 324 is rotatably connected to a distal end 322b of proximal housing 322. Proximal portion 324a of distal housing 324 is configured to retain cable couplers 206, 208 of endoscope 200 therein. In particular, proximal portion 324a of distal housing 324 has a latch lock mechanism 340 that allows for the selective removal and insertion of endoscope 200 into adapter assembly 320. Latch lock mechanism 340 includes a latch 342 that is pivotably connected to proximal portion 324a of distal housing 324, and a lock 344. Latch 342 has a male mating feature or projection 346 that is configured to interface with a corresponding female mating feature or recess (not shown) defined in lock 344.

Figure 10:
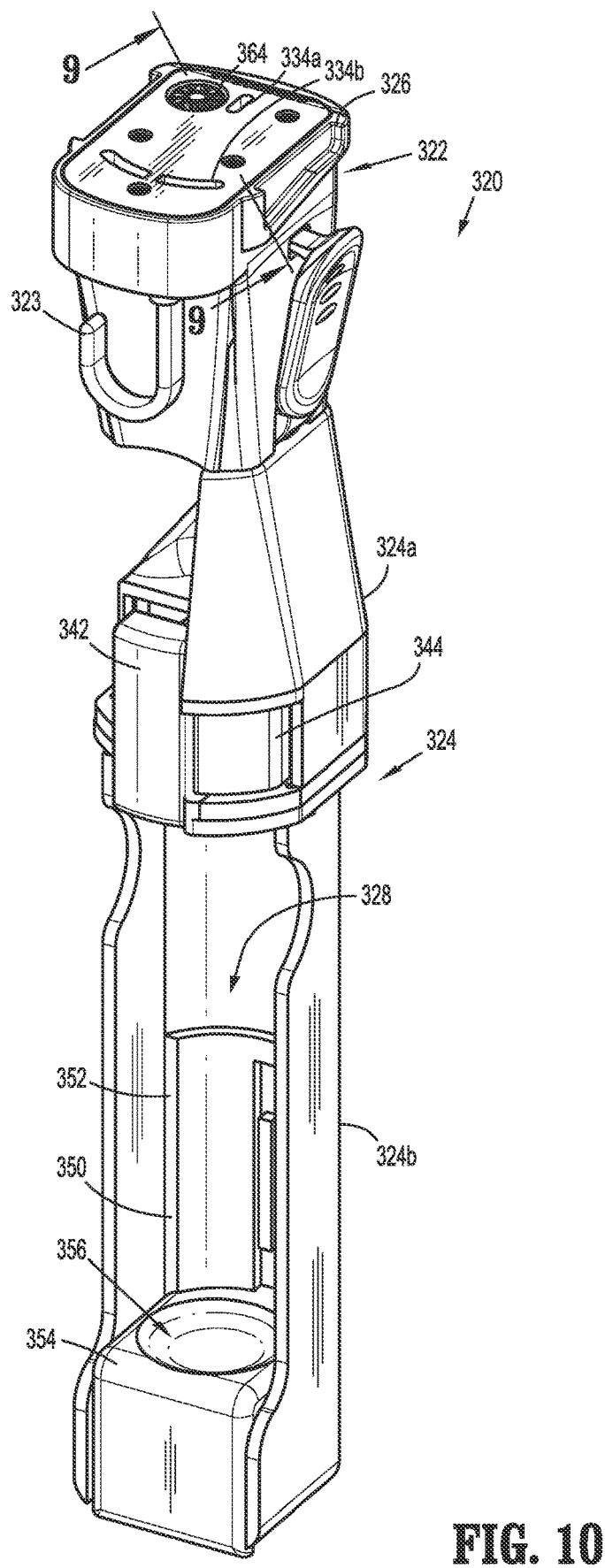
FIG. 10 is a perspective view of the adapter assembly of FIG. 8 without the endoscope disposed therein.
Figure 11:
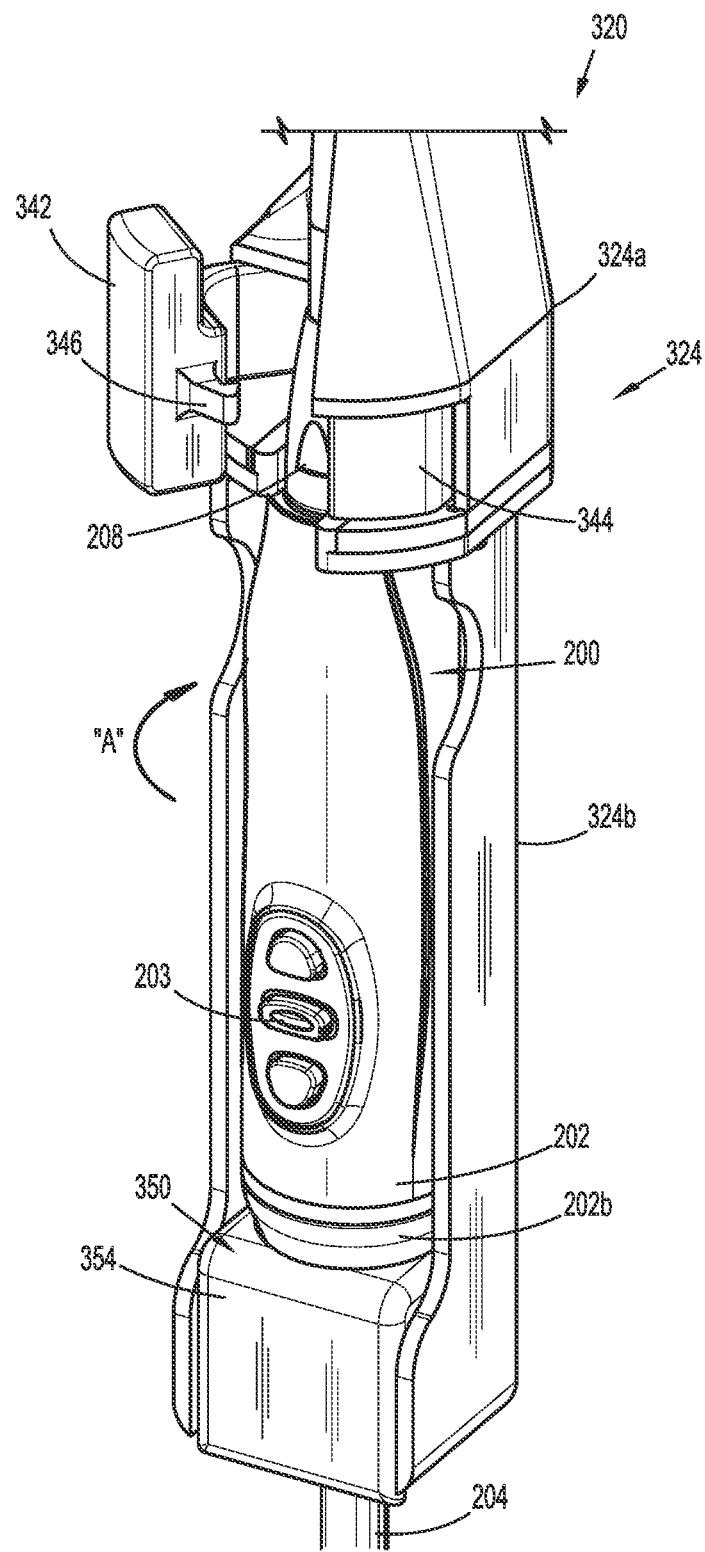
FIG. 11 is a perspective view of the adapter assembly of FIG. 8 with the endoscope disposed therein and illustrating a latch mechanism in an unlocked state.
Figure 12:
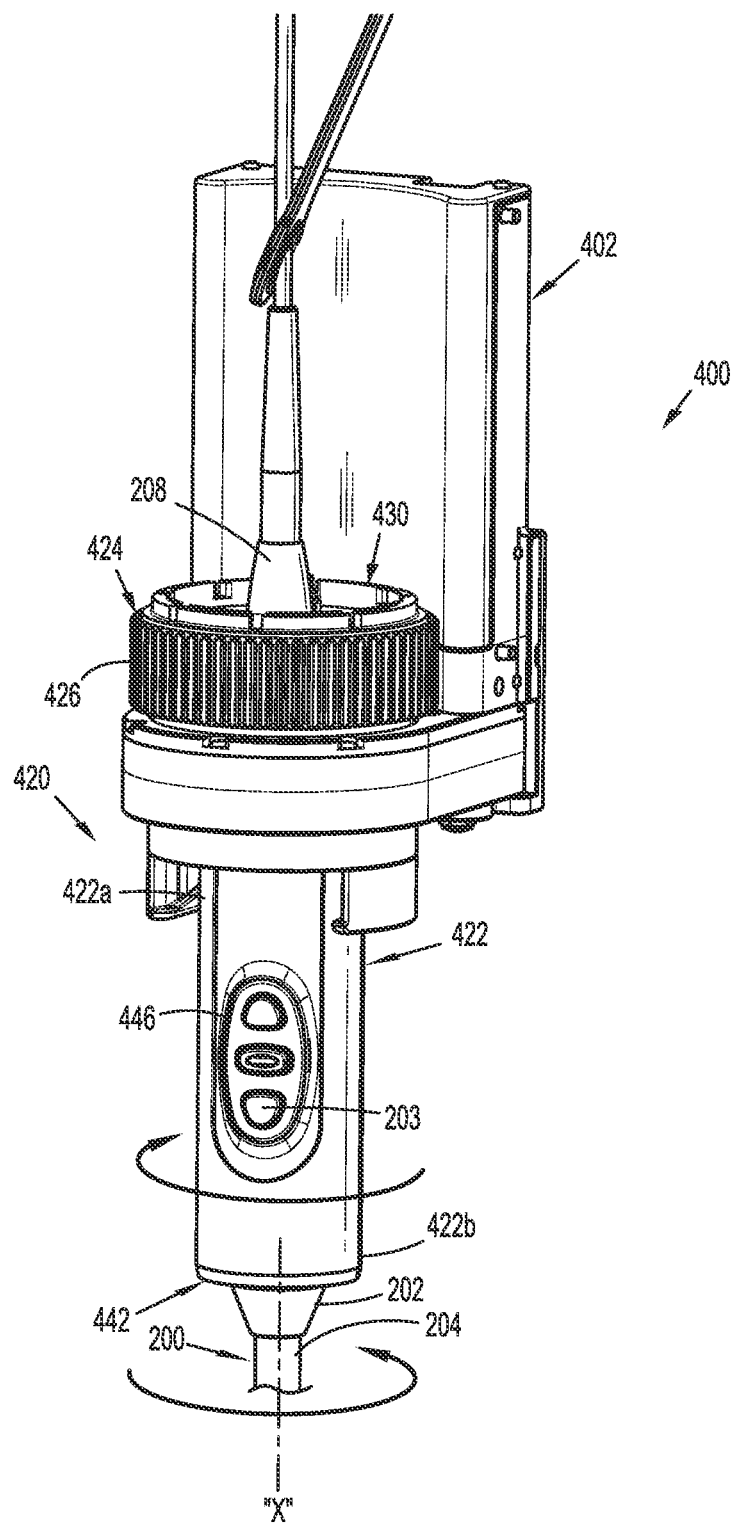
FIG. 12 is a perspective view of another embodiment of a surgical assembly for use in the robotic surgical system of FIG. 1 including a surgical instrument holder, an adapter assembly, and the endoscope of FIG. 7.
Figure 15:
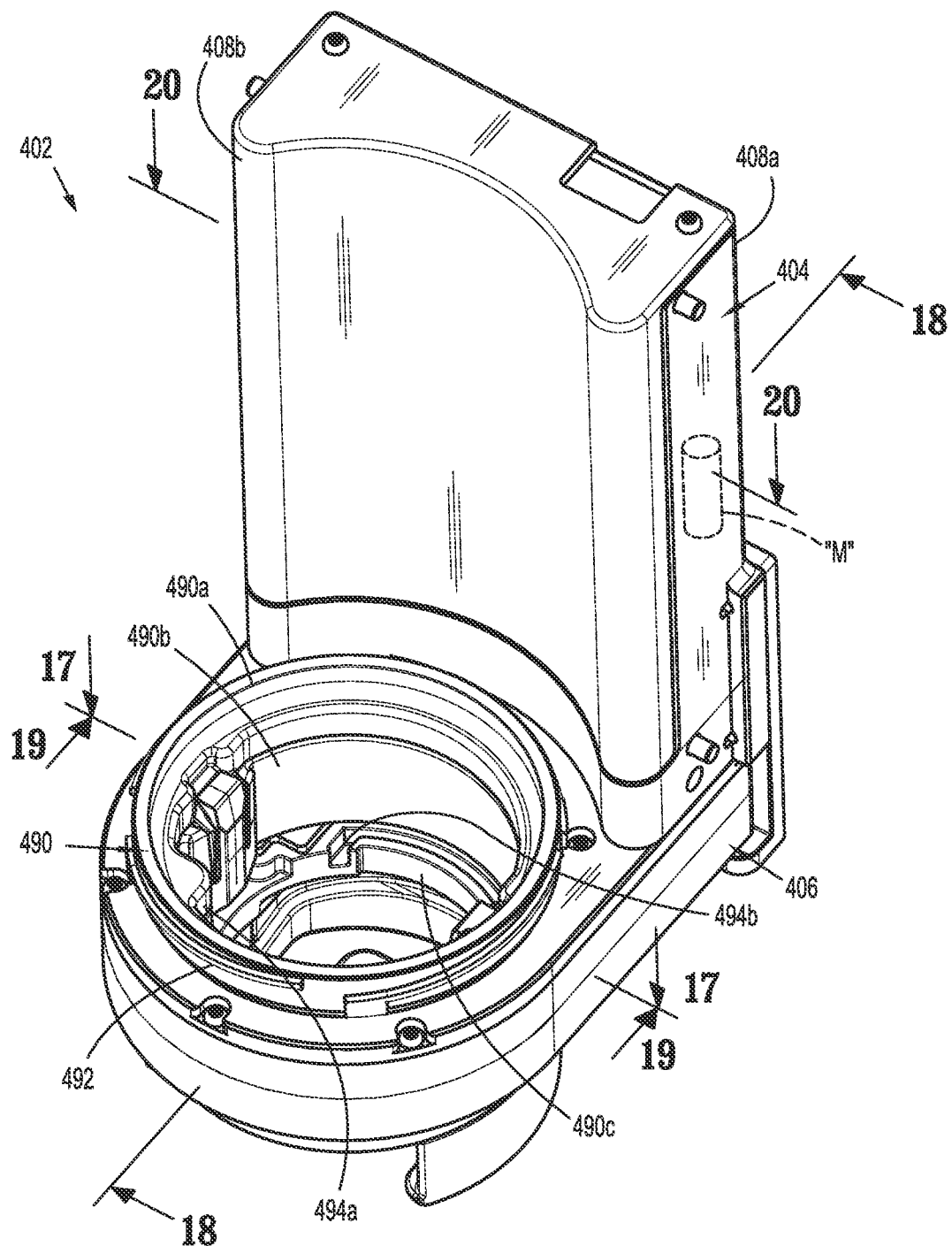
FIG. 15 is a perspective view of the surgical instrument holder of FIG. 12.

Latch 342 of latch lock mechanism 340 is pivotable between a locked configuration, as shown in FIG. 10, and an unlocked configuration, as shown in FIG. 11. In the locked configuration, male mating feature 346 of latch 342 is engaged to the female mating feature of lock 344, thereby encapsulating couplers 206, 208 of endoscope 200 within proximal portion 324a of distal housing 324 and inhibiting removal of endoscope 200 therefrom. In the unlocked configuration, latch 342 is spaced from lock 344 allowing for either the removal of endoscope 200 from adapter assembly 320 or the insertion of endoscope 200 into adapter assembly 320. In some embodiments, any suitable locking mechanism may be provided on distal portion 324b of adapter assembly 320 or any portion of adapter assembly 320 to aid in the selective securement of endoscope 200 within adapter assembly 320.

Distal portion 324b of distal housing 324 has a generally elongate configuration and a hollow interior 328 configured for receipt of an endoscope, for example, endoscope 200. Hollow interior 328 has a generally non-circular shape, for example, rectangular, for non-rotatably retaining endoscope 200 therein. Due to the shape of hollow interior 328 of distal portion 324b of distal housing 324, a rotation of distal housing 324 of adapter assembly 320 causes endoscope 200 to rotate therewith.

Distal housing 324 of adapter assembly 320 further includes an inner housing 350 seated within distal portion 324b of distal housing 324. Inner housing 350 has a curved wall 352 that extends longitudinally within distal housing 324 and is configured to cup or partially surround an outer surface of proximal portion 202 of endoscope 200. Inner housing 350 also includes a base 354 having a generally squared shape that prevents inner housing 350 from rotating within and relative to distal housing 324. Base 354 prevents endoscope 200 from sliding distally out of adapter assembly 320. Distal housing 324 includes a biasing member, for example, a compression spring 353, disposed between base 354 and a distal end of distal housing 324 to allow base 354 to move between a lower position relative to the distal end of distal housing 324 and a higher position relative to the distal end of the distal housing 324 to facilitate insertion of endoscope 200 in base 354.

Base 354 of inner housing 350 defines a bore 356 therethrough configured for receipt of endoscope 200. Bore 356 of base 354 of inner housing 350 has a cone-shaped upper portion 356a, and a cylindrical lower portion 356b that extends distally from upper portion 356a. Upper portion 356a of bore 356 of base 345 is configured to receive a cone-shaped or tapered distal end 202b of proximal portion 202 of endoscope 200, and lower portion 356b of bore 356 is configured to house a cylindrical proximal end 204a of tube 204 of endoscope 200. This configuration of bore 356 accommodates length variability in a variety of endoscopes. It is contemplated that a plurality of different sized inner housings may be provided with each configured to retain a particularly sized endoscope. In some embodiments, inner housing 350 may be pivotable in relation to distal portion 324b of distal housing 324 to facilitate insertion of endoscope 200 into bore 356 of inner housing 350.

Figure 9:
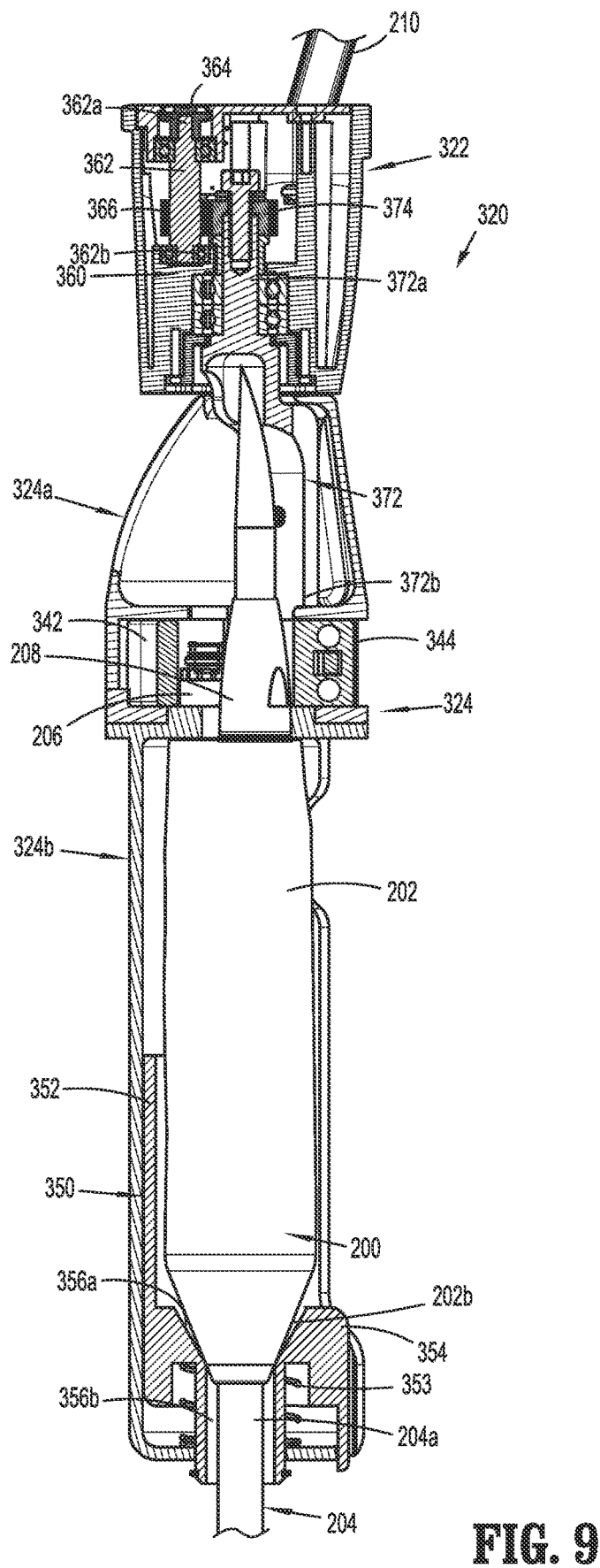
FIG. 9 is a cross-sectional view, taken along lines 9-9 in FIG. 8, of the adapter assembly having the endoscope disposed therein.

With specific reference to FIG. 9, drive assembly 360 of adapter assembly 320 is configured to transfer rotation of drive shaft 117 (FIG. 2) of instrument drive unit 110 into rotation of distal housing 324 of adapter assembly 320 relative to proximal housing 322 of adapter assembly 320. Drive assembly 360 includes a first drive shaft 362 having a proximal end 362a and a distal end 362b. Proximal end 362a of first drive shaft 360 has an input 364 in the form of a gear, such as, for example, a crown gear. Input 364 is configured for detachable operable engagement with the gear (not shown) of drive shaft 117 (FIG. 2) of motor 115 of instrument drive unit 110 such that actuation of motor 115 of instrument drive unit 110 results in rotation of first drive shaft 362 of drive assembly 360. Distal end 362b of first drive shaft 362 has a gear, such as, for example, a spur gear 366.

Drive assembly 360 includes a second drive shaft 372 extending longitudinally through proximal housing 322 and proximal portion 324a of distal housing 324 and is laterally offset from first drive shaft 362. Second drive shaft 372 has a proximal end 372a, and a distal end 372b extending between proximal housing 322 and proximal portion 324a of distal housing 324. Proximal end 372a of second drive shaft 372 has a gear, such as, for example, a spur gear 374, in operable engagement with spur gear 366 of first drive shaft 362 such that rotation of first drive shaft 362 results in rotation of second drive shaft 372. Distal end 372b of second drive shaft 372 is disposed within proximal portion 324a of distal housing 324 and is fixed to a surface thereof such that rotation of second drive shaft 372 results in a rotation of distal housing 324 relative to proximal housing 322.

It is contemplated that drive assembly 360 of adapter assembly 320 may be substituted with any suitable mechanism that transfers rotational motion originating from motor 115 of instrument drive unit 110 into rotation of distal housing 324 of adapter assembly 320 relative to proximal housing 322 of adapter assembly 320.

In operation, carriage 104 (FIG. 2) of surgical instrument holder 102 is attached to rail 40 of robotic arm 2. Instrument drive unit 110 is positioned within the channel (not shown) of surgical instrument holder 102 and supported on side 108b of carriage 104 of surgical instrument holder 102. Proximal portion 322a of proximal housing 322 of adapter assembly 320 is non-rotatably coupled to motor assembly 114 of instrument drive unit 110 and motor 115 of instrument drive unit 110 is operably coupled to input 364 of drive assembly 360 of adapter assembly 320. Tube 204 of endoscope 200 is slidably received within bore 356 of inner housing 350 of adapter assembly 320 to seat endoscope 200 in inner housing 350 of adapter assembly 320. With latch lock mechanism 340 in the unlocked configuration, proximal portion 202 of endoscope 200 is pivoted, in a direction indicated by arrow "A" in FIG. 11, so that couplers 206, 208 of endoscope 200 are received within proximal portion 324a of distal housing 324 of adapter assembly 320. Cables 210, 212 of endoscope 200 are guided through proximal housing 322 of adapter assembly 320 and out through openings 334a, 334b of proximal housing 322 of adapter assembly 322. With endoscope 200 disposed within adapter assembly 320, latch lock mechanism 340 is then locked. With endoscope 200 retained within adapter assembly 320, endoscope 200 may be manipulated, for example, rotated, to a selected rotational position about its longitudinal axis "X."

In particular, endoscope 200 may be rotated at a first rate or a second rate, slower than the first rate, depending on how precise the clinician needs to be with positioning the endoscope 200 in a surgical site. To move endoscope 200 at the first, faster rate, a clinician operating manual input devices 7, 8 of surgical system 1, may actuate motor 115 of motor assembly 114 of instrument drive unit 110. Actuation of motor 115 of instrument drive unit 110 rotates the gear (not shown) thereof, which rotates input 364 of drive assembly 360 of adapter assembly 320 due to input 364 of drive assembly 360 being operably engaged to the gear of instrument drive unit 110. Rotation of input 364 rotates first drive shaft 362 of drive assembly 360, and in turn rotates second drive shaft 372 of drive assembly 360 due to gears 366, 374 of respective first and second drive shafts 362, 372 being in meshing engagement. Since distal end 372b of second drive shaft 372 is fixed to distal housing 324, rotation of second drive shaft 372 of drive assembly 360 effects rotation of distal housing 324 relative to proximal housing 322. With endoscope 200 retained within distal housing 324, endoscope 200 rotates about its longitudinal axis "X" as distal housing 324 rotates. It is contemplated that by actuating motor 115 of motor assembly 114, distal housing 324 and endoscope 200 can be rotated up to about 180 degrees, in either direction, relative to proximal housing 322.

To move endoscope 200 at the second, slower rate, a clinician operating manual input devices 7, 8 of surgical system 1, may actuate motor "M" of surgical instrument holder 102. Actuation of motor "M" of surgical instrument holder 102 drives a rotation of the motor shaft (not shown) thereof, which transfers its rotational motion to motor assembly 114 of instrument drive unit 110. Since motor assembly 114 of instrument drive unit 110 is non-rotatably connected to proximal portion 322a of proximal housing 322 of adapter assembly 320, rotation of motor assembly 114 of instrument drive unit 110 causes proximal housing 322 of adapter assembly 320 to rotate and in turn rotates distal housing 324 of adapter assembly 320 and endoscope 200 about its longitudinal axis "X." It is contemplated that distal housing 324 of adapter assembly 320 and endoscope 200 can be rotated up to about 180 degrees, in either direction, by motor "M" of surgical instrument holder 102.

With reference to FIGS. 12-20, another embodiment of a surgical assembly 400 will be described herein. The surgical assembly 400 includes an endoscope, such as, for example, the stand alone endoscope 200 of FIG. 7, and an adapter assembly 420 configured for receipt of endoscope 200. It is contemplated that a plurality of different types of endoscopes may be able to fit within an elongate housing 422 of adapter assembly 420 other than endoscope 200 illustrated in FIG. 7. Alternately, it is contemplated that a variety of different elongate housings 422 of adapter assembly 420 may be available or provided which are specifically configured to interconnect a specific endoscope to robotic surgical system 1 (FIG. 1).

With reference to FIGS. 12-15, adapter assembly 420 selectively intercouples surgical instrument holder 402 and endoscope 200 to transfer rotational motion originating from surgical instrument holder 402 into rotational motion of endoscope 200 about its longitudinal axis "X." Adapter assembly 420 generally includes an elongate housing 422 and a locking collar 424 non-rotatably coupled to elongate housing 422. Elongate housing 422 has a proximal end 422a having locking collar 424 non-rotatably attached thereto, and a distal end 422b. Elongate housing 422 of adapter assembly 420 has a generally cylindrical configuration and defines a channel 442 longitudinally therethrough. Channel 442 is configured to non-rotatably receive and retain proximal portion 202 of endoscope 200 therein.

Elongate housing 422 of adapter assembly 420 includes a first half section 444a and a second half section 444b. First and second half sections 444a, 444b of elongate housing 422 are removably connected to one another so that proximal portion 202 of endoscope 200 may be encapsulated by elongate housing 422 when first and second half sections 444a, 444b are connected to one another, and removed from or inserted within elongate housing 422 when first and second half sections 444a, 444b of elongate housing 422 are disconnected from one another. In some embodiments, elongate housing 422 may be monolithically formed from a pliable material that conforms to proximal portion 202 of endoscope 200 such that endoscope 200 can be selectively inserted into or removed from elongate housing 422. Elongate housing 422 defines an opening 446 extending between an inner surface and an outer surface thereof. Opening 446 of elongate housing 422 has an elliptical shape and is configured to align with control buttons 203 on proximal portion 202 of endoscope 200 upon receipt of endoscope 200 into elongate housing 422.

Locking collar 424 of adapter assembly 420 is receivable within surgical instrument holder 402 to be drivingly coupled to a motor "M" (FIG. 20) of surgical instrument holder 402 such that an actuation of motor "M" effects rotation of adapter assembly 420. Locking collar 424 includes an annular member 426 and a pair of surface features 428a, 428b extending distally therefrom. Annular member 426 of locking collar 424 is non-rotatably disposed about proximal end 422a of elongate housing 422 to transfer rotation caused by actuation of "M" of surgical instrument holder 402 to elongate housing 422 and in turn to endoscope 200. Annular member 426 defines a circular bore 430 therethrough configured for the passage of various cables of an endoscope, for example, endoscope 200. Annular member 426 of locking collar 424 has an inner surface 432 having a mating feature, for example, threading 434, configured for mating or threading engagement with a corresponding mating feature 492 of an inner member 490 of surgical instrument holder 402.

Surface features 428a, 428b of locking collar 424 are male mating members, such as, for example, a pair of arcuate tabs extending distally from annular member 426 of locking collar 424. Tabs 428a, 428b are configured for mating receipt within respective recesses 494a, 494b defined in inner member 490 of surgical instrument holder 402 to assist in the transfer of rotational motion from inner member 490 of surgical instrument holder 402 to locking collar 424 of adapter assembly 420. As such, with annular member 426 of locking collar 424 of adapter assembly 420 matingly engaged to inner member 490 of surgical instrument holder 402, a rotation of inner member 490 of surgical instrument holder 402 causes adapter assembly 420 to rotate therewith.

With reference to FIGS. 15-20, surgical instrument holder 402 of surgical assembly 400 functions to support adapter assembly 420 therein, and to effect a rotation of adapter assembly 420 relative thereto. Surgical instrument holder 402, which is similar to the holder 102 of FIG. 2, includes a back member or carriage 404, and an outer member or housing 406 extending laterally (e.g., perpendicularly) from an end of carriage 404. In some embodiments, outer member 406 may extend at various angles relative to carriage 404 and from various portions of carriage 404. Carriage 404 has a first side 408a and a second side 408b, opposite first side 408a. First side 408a of carriage 404 is slidably connected to rail 40 of robotic arm 2 (FIG. 2) to enable surgical instrument holder 402 to slide or translate along rail 40 (FIG. 2) of robotic arm 2. In some embodiments, first side 408a of carriage 404 may also be detachably connected to rail 40.

Carriage 404 of surgical instrument holder 402 supports or houses a motor, such as, for example, a canister motor "M" therein. Motor "M" receives controls and power from control device 4 (FIG. 1) to ultimately rotate adapter assembly 420 and endoscope 200 when adapter assembly 420, with endoscope 200, is attached to surgical instrument holder 402. In some embodiments, carriage 404 may include a printed circuit board in electrical communication with motor "M" to control an operation of motor "M" of carriage 404. Carriage 404 has a rotatable drive shaft extending from motor "M" and longitudinally through carriage 404. The drive shaft of carriage 404 is operably coupled to a drive assembly 450 of surgical instrument holder 402, which transfers a rotation from motor "M" of surgical instrument holder 402 to adapter assembly 420 when adapter assembly 420 is received in surgical instrument holder 402, as will be described in detail below.

With continued reference to FIGS. 15-20, drive assembly 450 of surgical instrument holder 402 resides within outer member 406 of surgical instrument holder 402 and is configured to transfer a rotation of the drive shaft of motor "M" of surgical instrument holder 402 into rotational motion of adapter assembly 420 when adapter assembly 420 is operably received within surgical instrument holder 402. In particular, drive assembly 450 of surgical instrument holder 402 includes a first pulley 454 and a second pulley 456 each disposed within outer member 406. First pulley 454 is non-rotatably coupled to the drive shaft of motor "M" of surgical instrument holder 402 such that rotation of the drive shaft effects rotation of first pulley 454 relative to outer member 406. First and second pulleys 454, 456 may be selectively movable within housing 406 to different locations of housing 406. First and second pulleys 454, 456 are each in the form of gears, such as, for example, spur gears, having teeth 458 extending radially from a periphery thereof. In some embodiments, first and second pulleys 454, 456 may have smooth outer surfaces without teeth.

Drive assembly 450 further includes a drive strap or belt 460 rotatably and/or translatably received within outer member 406. Belt 460 is a closed loop and fabricated from a pliable material such that belt 460 may be manipulated into any suitable shape. In particular, belt 460 takes on the oblong semicircular shape of outer member 406 upon being received in outer member 406. In some embodiments, belt 460 may be formed from a rigid material and have a permanent oblong semicircular shape corresponding to the shape of outer member 406. Belt 460 has teeth 462 extending from an inner surface thereof. Belt 460 is wrapped around first and second pulleys 454, 456 such that teeth 462 of belt 460 are in operable engagement with teeth 458 of first and second pulleys 454, 456. In this way, rotation of first pulley 454 caused by actuation of motor "M" of carriage 404, causes belt 460 to rotate around first and second pulleys 454, 456. Second pulley 456 acts as an idler pulley to guide belt 460 around the inner periphery of outer member 406. It is contemplated that second pulley 456 may be selectively moved to a plurality of positions to effect the tension on/of belt 460.

In some embodiments, first pulley 454 and belt 460 do not have teeth for transferring rotational motion between one another. Instead, rotation is transferred between first pulley 454 and belt 460 via the frictional engagement of a smooth inner surface of belt 460 with a smooth outer surface of first pulley 454. It is contemplated that each of the components of drive assembly 450 may be removable from housing 406 to facilitate assembly, repair, and adjustments of drive assembly 450.

Drive assembly 450 further includes a ring gear 480 rotatably disposed within outer member 406. Ring gear 480 has a plurality of teeth 482 extending radially from an outer surface thereof. Teeth 482 are in operable engagement with teeth 462 of belt 460. As such, rotation of belt 460 causes ring gear 480 to rotate within and relative to outer member 406.

With continued reference to FIGS. 15-20, inner member 490 of surgical instrument holder 402 is non-rotatably disposed within ring gear 480 of drive assembly 450 such that rotation of ring gear 480 causes inner member 490 to rotate therewith. In some embodiments, ring gear 480 may be monolithically formed with the outer surface of inner member 490. Inner member 490 is configured to non-rotatably receive adapter assembly 420 therein and to transfer a rotation of drive assembly 450 of surgical instrument holder 402 to adapter assembly 420. Inner member 490 has a circular configuration corresponding to the circular channel defined through outer member 406.

Figure 16:
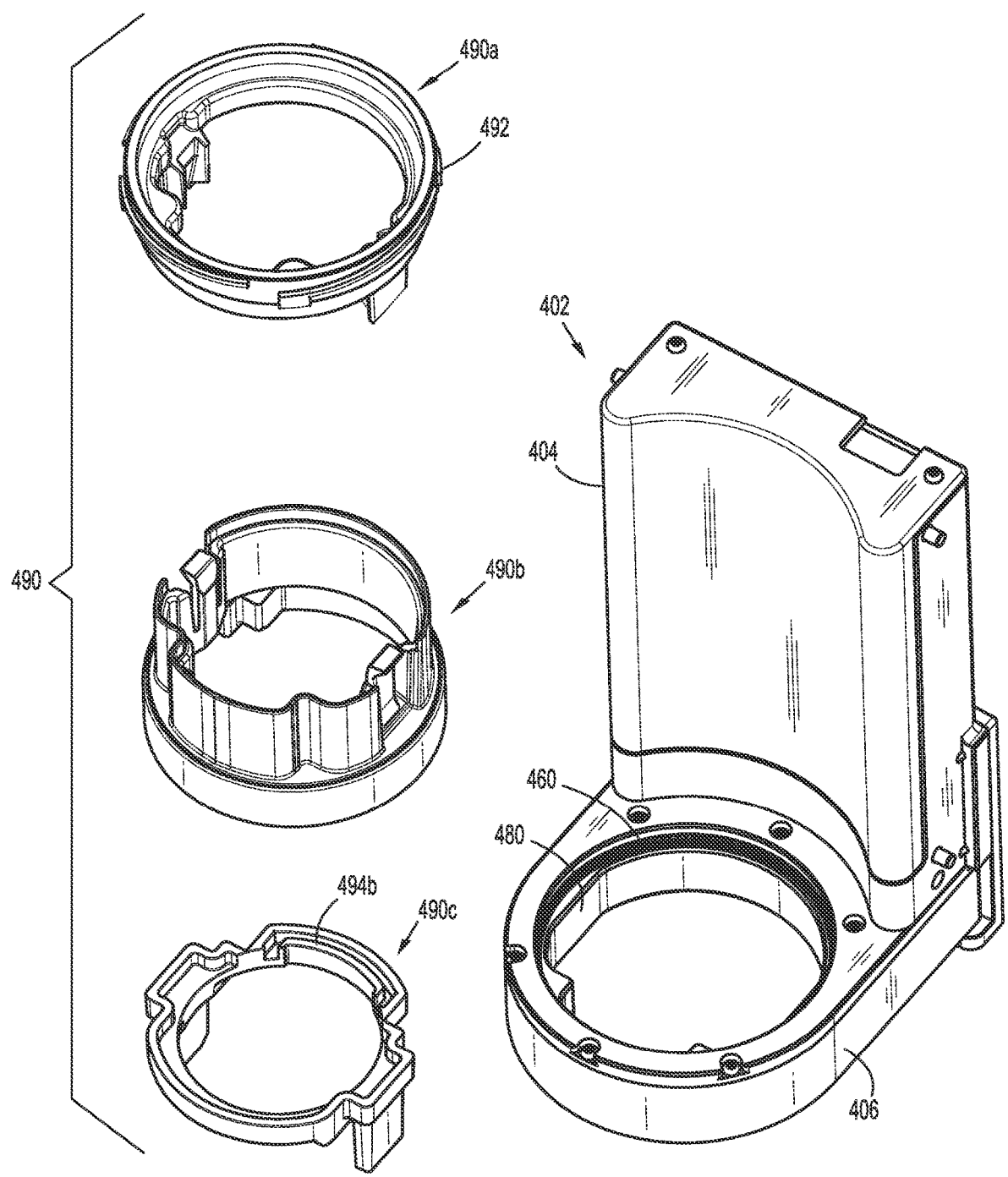
FIG. 16 is a perspective view, with parts separated, of an inner member of the surgical instrument holder of FIG. 15.
Figure 17:
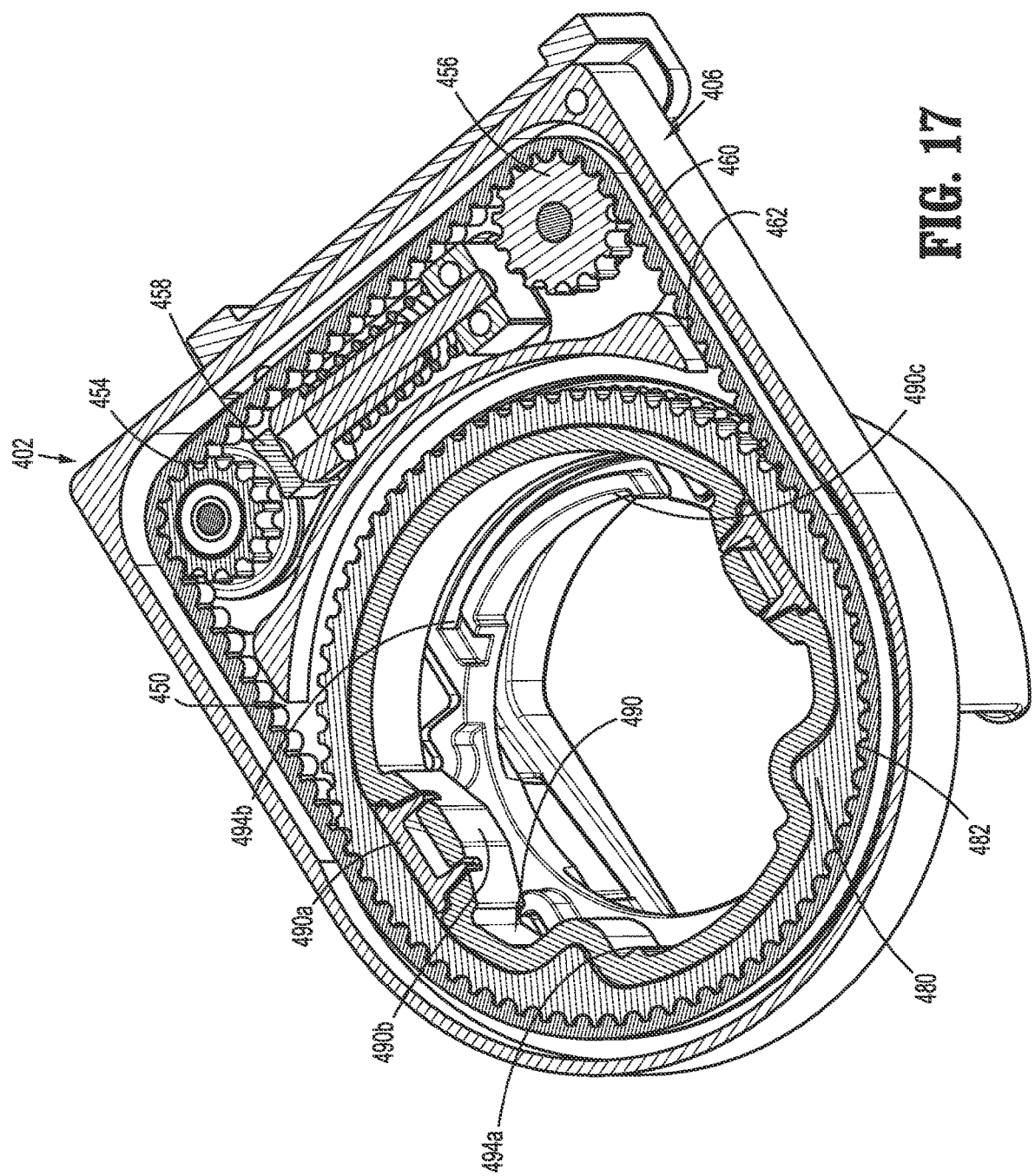
FIG. 17 is a cross-sectional view, taken along lines 17-17 of FIG. 15, illustrating a drive assembly of the surgical instrument holder.
Figure 18:
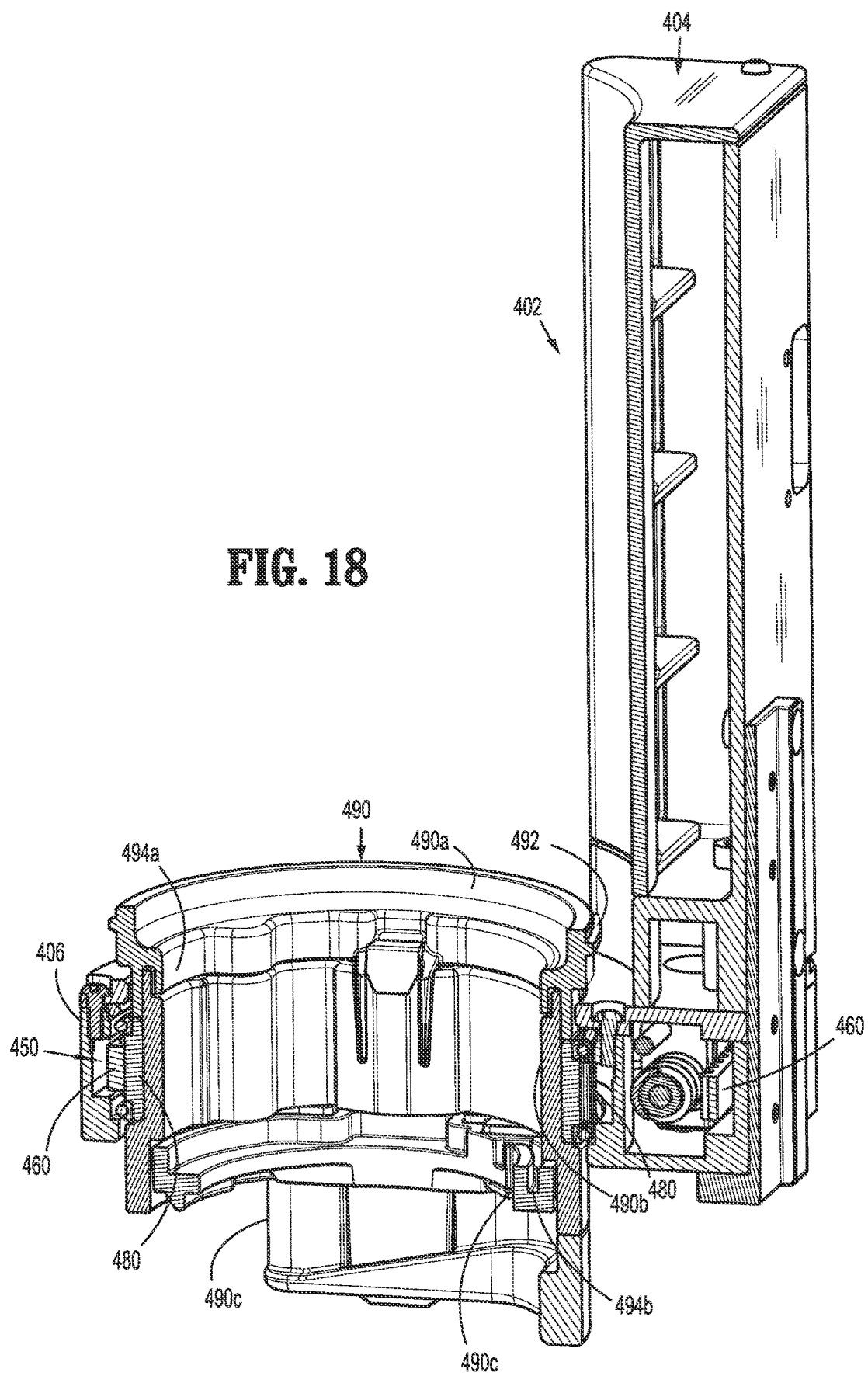
FIG. 18 is a cross-sectional view, taken along lines 18-18 of FIG. 15, illustrating the drive assembly of the surgical instrument holder.
Figure 19:
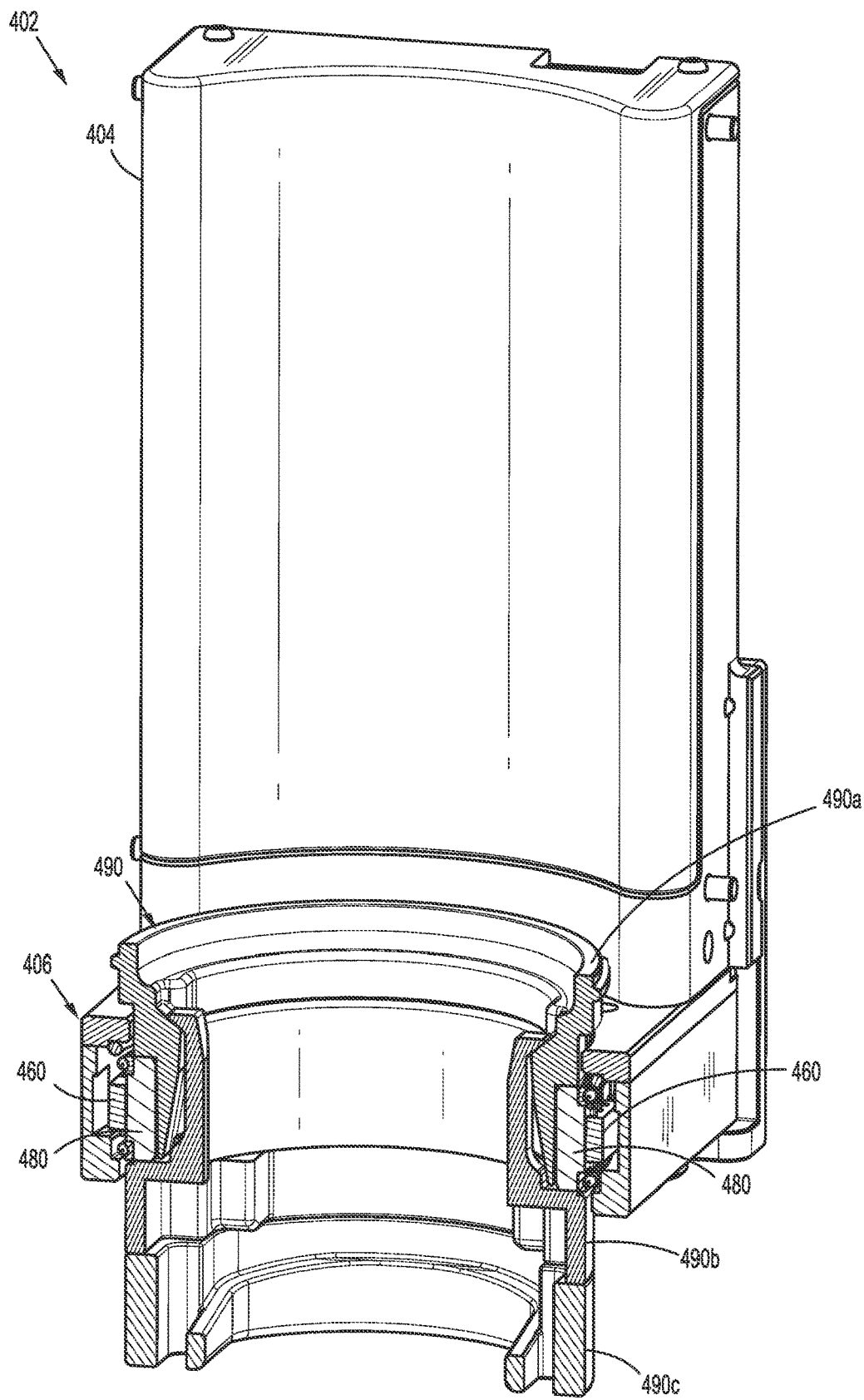
FIG. 19 is a cross-sectional view, taken along lines 19-19 of FIG. 15, illustrating the drive assembly of the surgical instrument holder.
Figure 20:
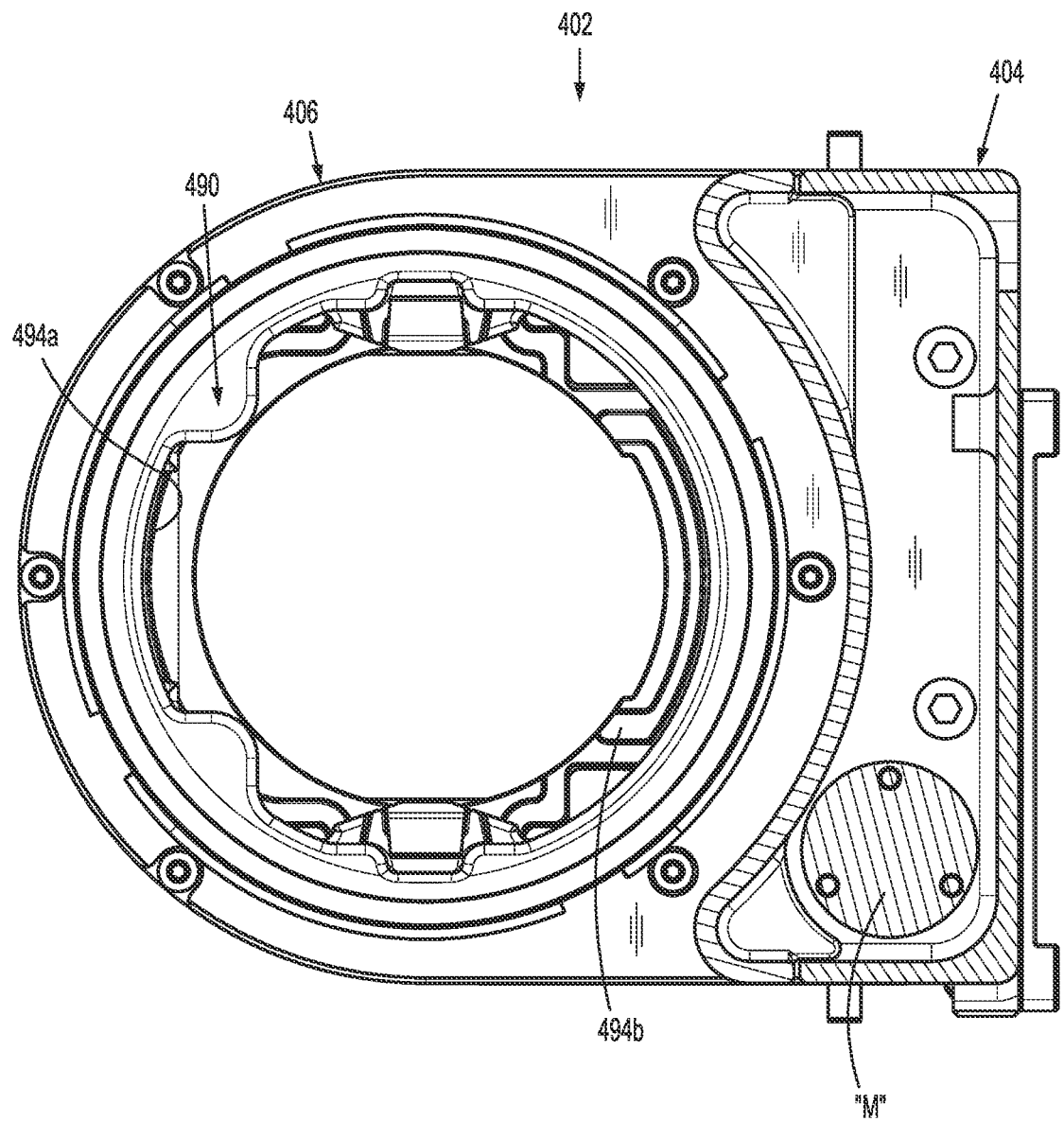
FIG. 20 is a cross-sectional view, taken along lines 20-20 of FIG. 15, illustrating the surgical instrument holder.
Figure 21A:
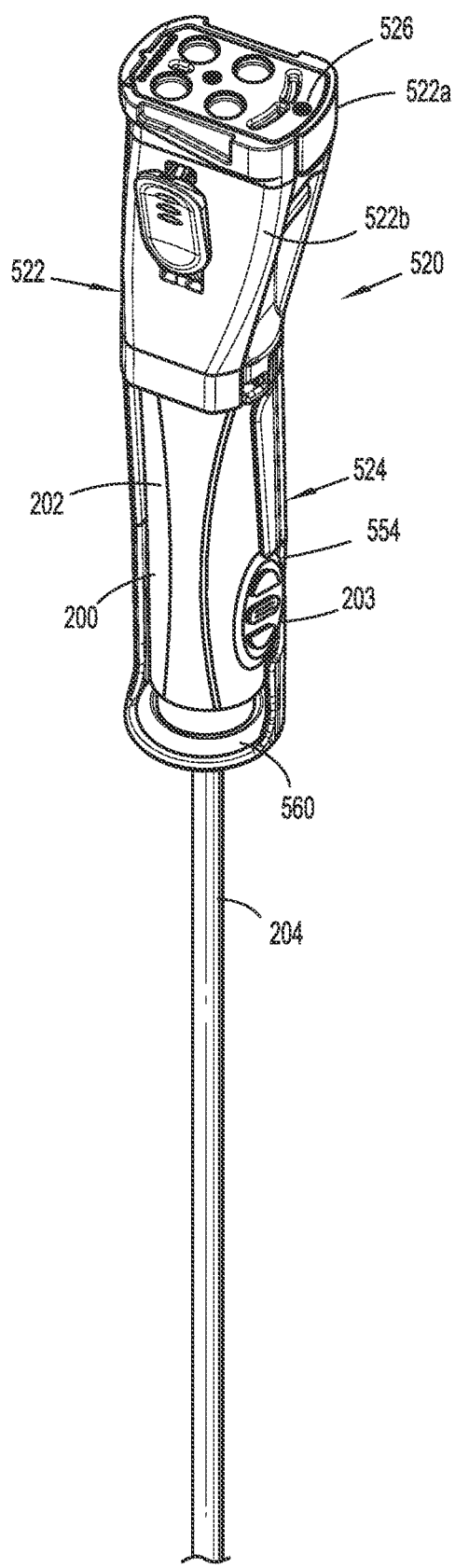
FIG. 21A is a perspective view of another embodiment of an adapter assembly for interconnecting the instrument drive unit of FIG. 2 and the endoscope of FIG. 7.
Figure 21B:
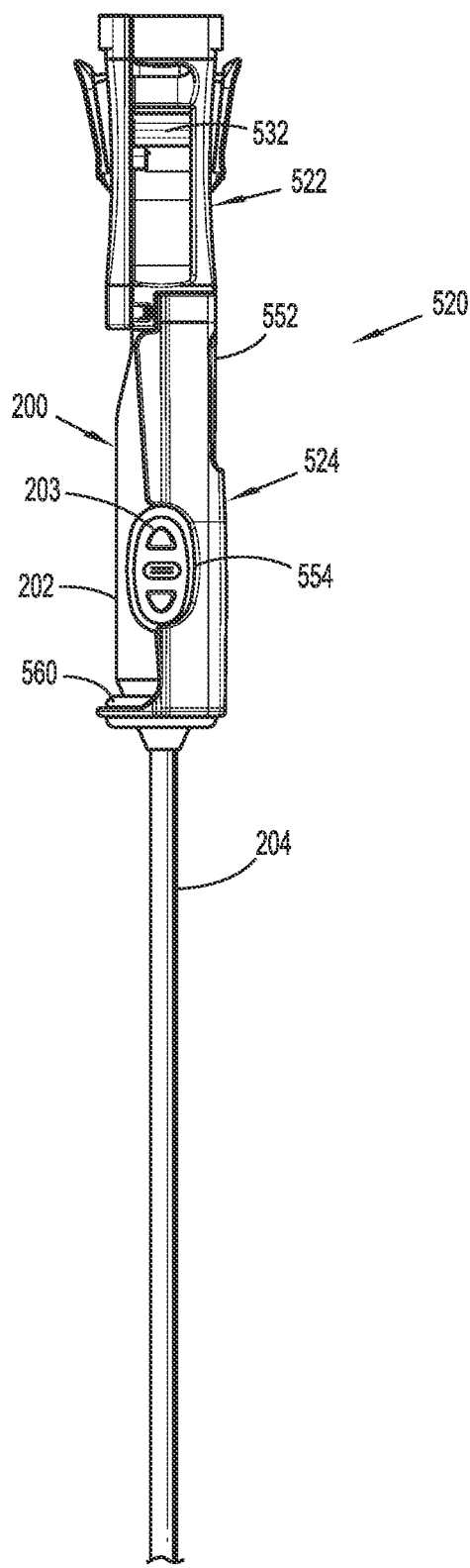
FIG. 21B is a front view of the adapter assembly of FIG. 21A.
Figure 22:
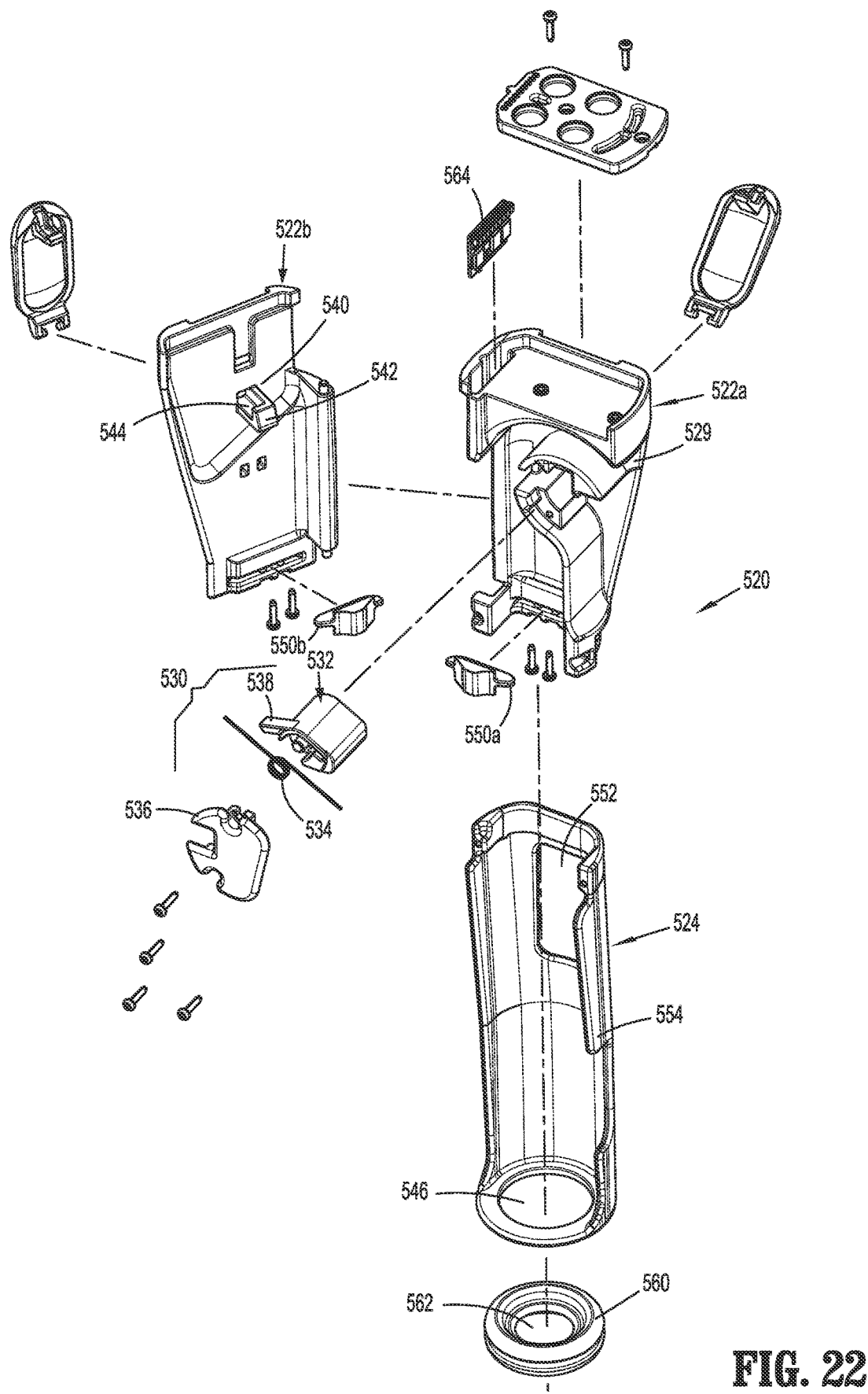
FIG. 22 is a perspective view, with parts separated, of the adapter assembly of FIG. 21A.
Figure 23:
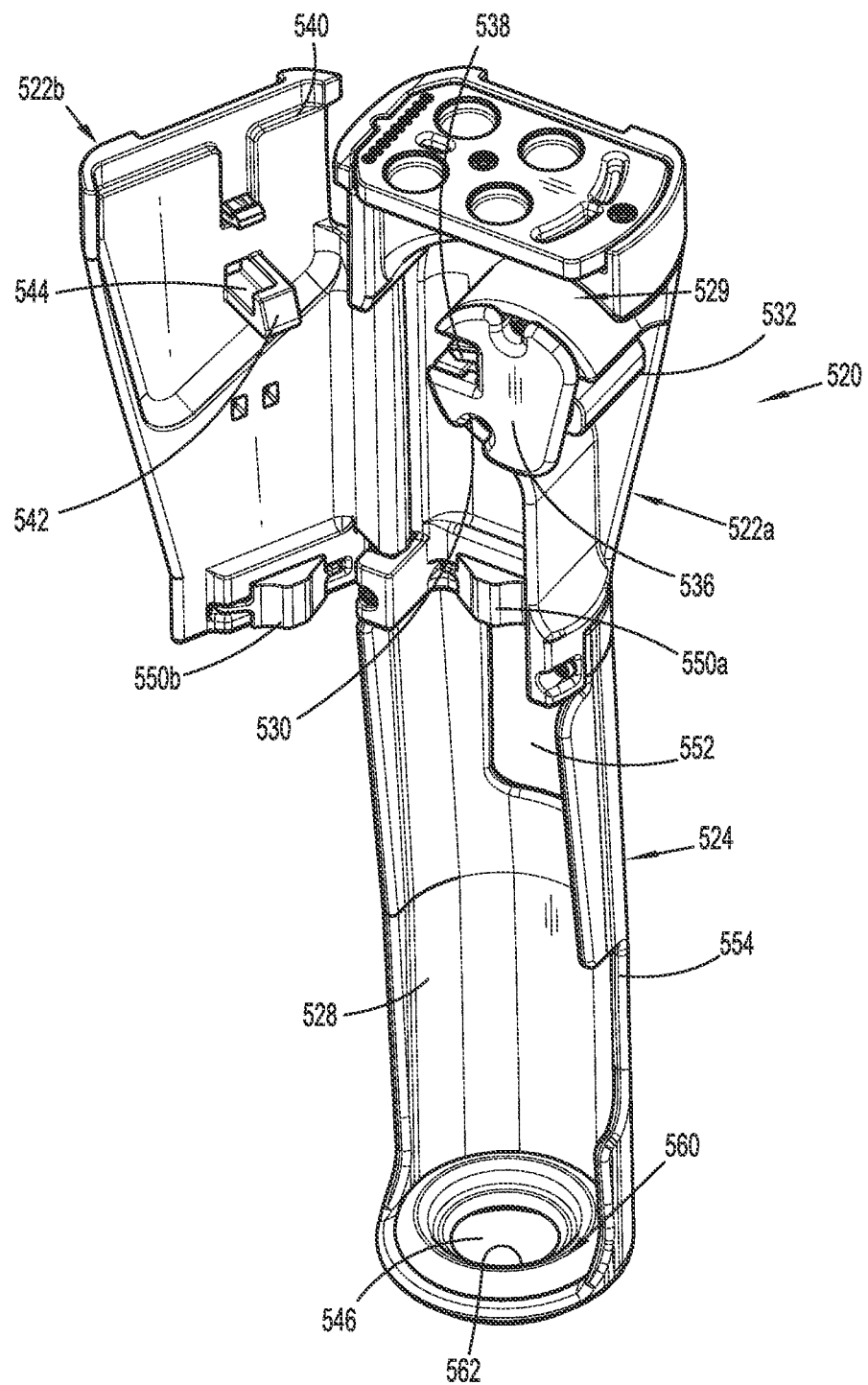
FIG. 23 is a perspective view of the adapter assembly of FIG. 21A illustrating a door of the adapter assembly in an open configuration exposing a locking assembly.
Figure 24:
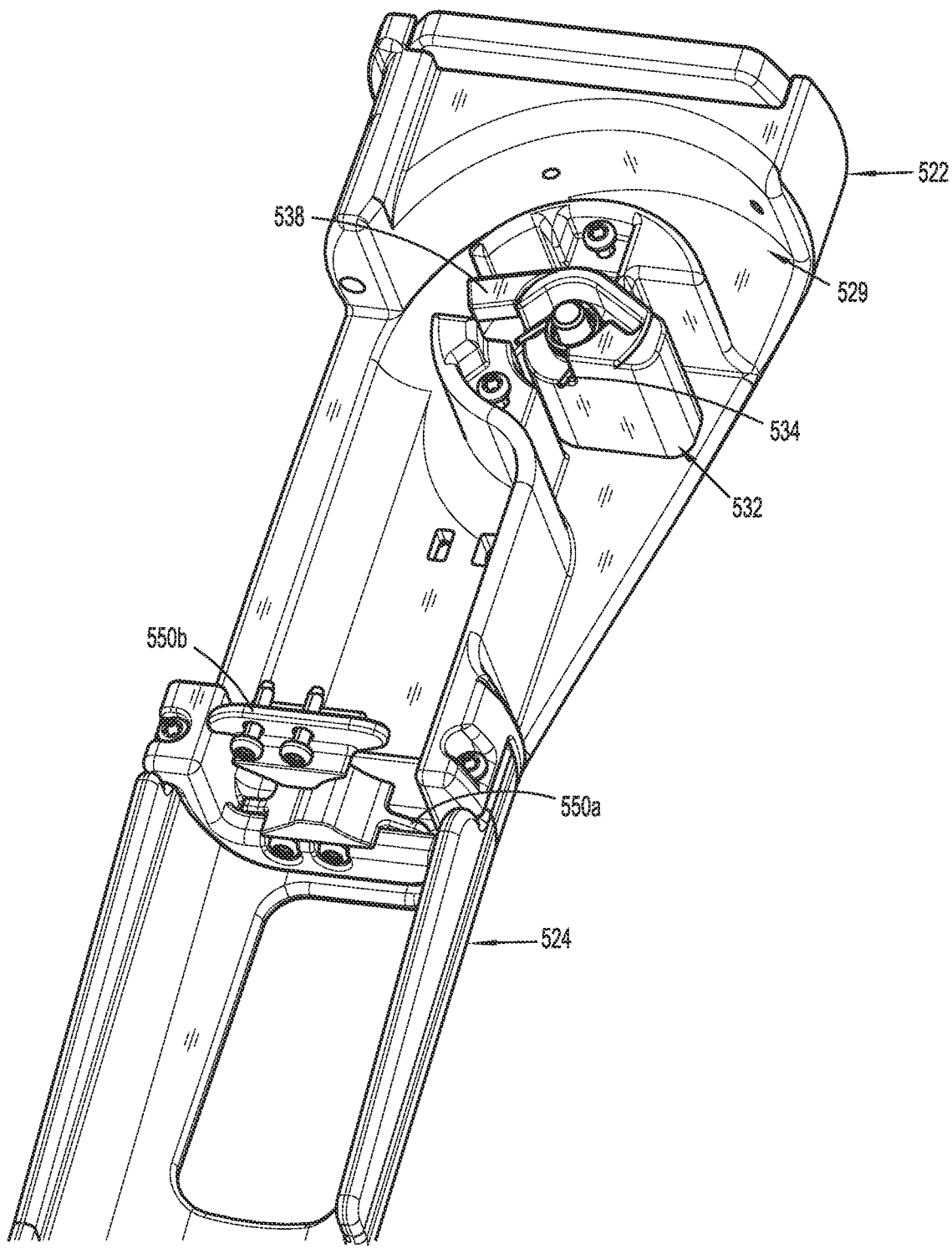
FIG. 24 is an enlarged partial view of the adapter assembly of FIG. 21A illustrating components of the locking assembly of FIG. 23.
Figure 25:
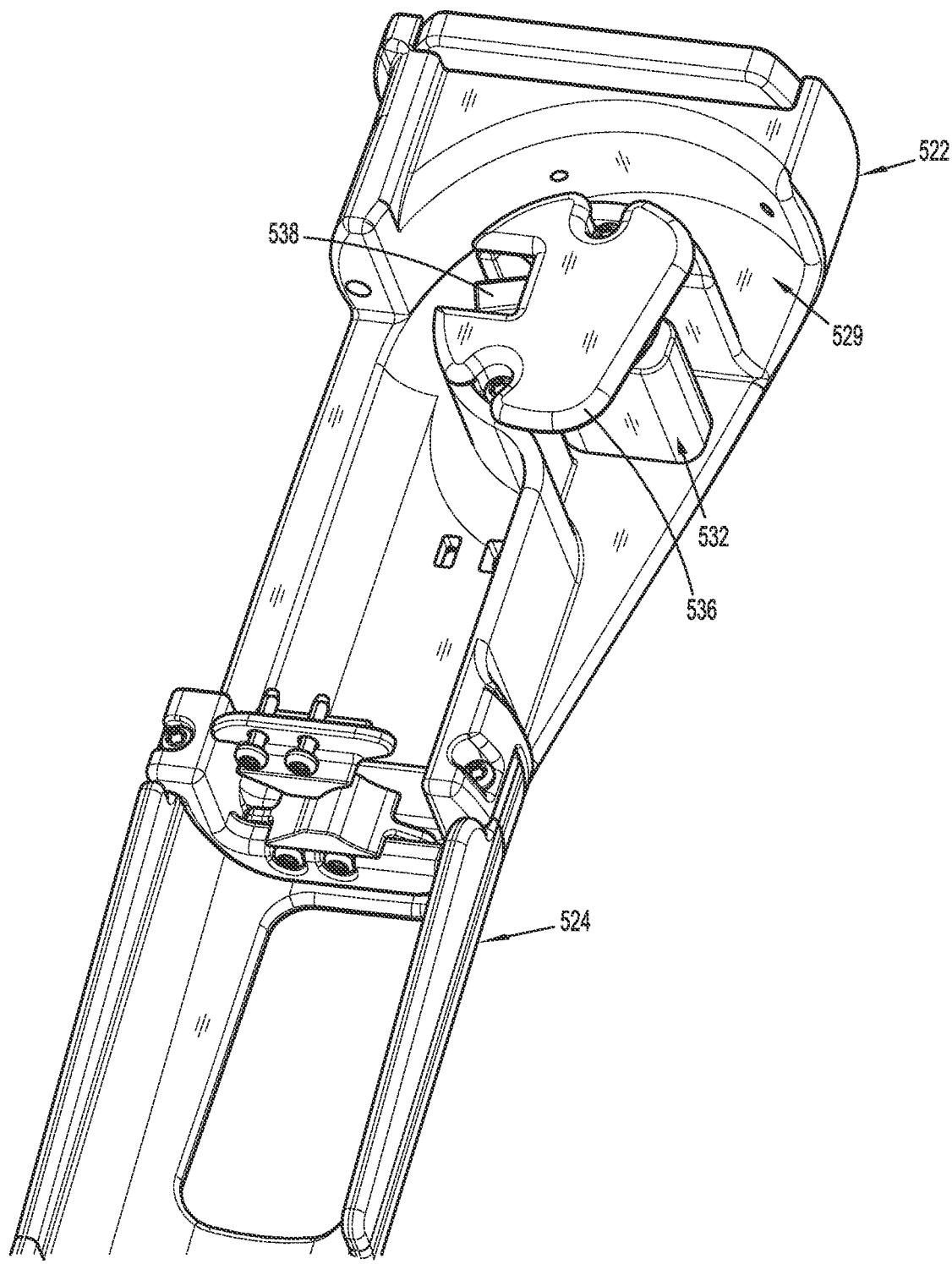
FIG. 25 is an enlarged partial view of the adapter assembly of FIG. 21A illustrating the locking assembly of FIG. 23 in an assembled state.

As illustrated, for example in FIG. 16, inner member 490 is an assembly of parts including an upper inner member 490a, an intermediate inner member 490b, and a lower inner member 490c. Upper and intermediate inner members 490a, 490b are attached to one another via a snap fit engagement. It is contemplated that inner member 490 may be a unitary piece and not be an assembly of parts. In some embodiments, upper and intermediate inner members 490a, 490b may be attached to one another via any suitable fastening arrangement. Upper inner member 490a has a threaded outer surface 492 configured for threading engagement with threading 434 (FIG. 14) of locking collar 424 of adapter assembly 420. Intermediate inner member 490b is non-rotatably received within ring gear 480 of drive assembly 450 of surgical instrument holder 402 such that rotation of ring gear 480 effects rotation of inner member 490 relative to outer member 406.

Upper and intermediate inner members 490a, 490b cooperatively define a recess 494a therein configured for receipt of one of tabs 428a, 428b of adapter assembly 420. Lower inner member 490c is non-rotatably received within intermediate inner member 490b. Lower inner member 490c defines a recess 494b therein that is offset about 180 degrees from recess 494a of upper and intermediate inner members 490a, 490b. Recess 494b of lower inner member 490c is configured for receipt of the other tab of tabs 428a, 428b of adapter assembly 420 such that upon receipt of adapter assembly 420 within surgical instrument holder 402, tabs 428a, 428b of locking collar 424 of adapter assembly 420 are seated within recesses 494a, 494b of inner member 490 of surgical instrument holder 402. In this way, rotation of inner member 490 relative to outer member 406 causes adapter assembly 420 to rotate therewith.

In operation, carriage 404 of surgical instrument holder 402 is attached to rail 40 (FIG. 2) of robotic arm 2. Tabs 428a, 428b of locking collar 424 of adapter assembly 420 are placed within recesses 494a, 494b of inner member 490 of surgical instrument holder 402 and adapter assembly 420 is manually rotated relative to outer member 406 to threadingly engage threaded outer surface 492 of inner member 490 of surgical instrument holder 402 with threaded inner surface 434 of locking collar 424 of adapter assembly 420. Cables 210, 212 (FIG. 7) of endoscope 200 are guided through distal end 422b of elongate housing 422 of adapter assembly 420 and out through annular member 426 of locking collar 424 of adapter assembly 420, and proximal portion 202 of endoscope 200 is secured within channel 442 of elongate housing 422 of adapter assembly 420. With proximal portion 202 of endoscope 200 retained within elongate housing 422 of adapter assembly 420, endoscope 200 may be manipulated, for example, rotated, to a selected rotational position about its longitudinal axis "X."

In particular, to rotate endoscope 200 about its longitudinal axis "X," a clinician operating manual input devices 7, 8 of surgical system 1 (FIG. 1), may actuate motor "M" of surgical instrument holder 402. Actuation of motor "M" of surgical instrument holder 402 drives a rotation of the motor shaft thereof, which transfers its rotational motion to first pulley 454 of drive assembly 450. Since belt 460 of drive assembly 450 is in operable engagement with first pulley 454 of drive assembly 450, and ring gear 480 of drive assembly 450 is in operable engagement with belt 460, rotation of first pulley 454 causes belt 460 of drive assembly 450 to rotate and in turn causes ring gear 480 of drive assembly 450 to rotate.

With inner member 490 of surgical instrument holder 402 non-rotatably received within ring gear 480, rotation of ring gear 480 of drive assembly 450 within outer member 406 of surgical instrument holder 402 drives a rotation of inner member 490 relative to outer member 406. The rotation of inner member 490 within outer member 406 of surgical instrument holder 402 drives a rotation of adapter assembly 420 given that locking collar 434 of adapter assembly 420 is lockingly engaged to inner member 490. With proximal end 202 of endoscope 200 non-rotatably coupled to elongate housing 422 of adapter assembly 420, rotation of adapter assembly 420 of surgical instrument holder 402 results in rotation of endoscope 200 about its longitudinal axis "X."

With reference to FIGS. 21A-25, another embodiment of an adapter assembly 520 is provided, similar to adapter assembly 120 described above with reference to FIGS. 2-6. Adapter assembly 520 selectively intercouples instrument drive unit 110 (FIG. 2) and an endoscope, for unit 110 (FIG. 2) into rotational motion of endoscope 200 about its longitudinal axis "X." Adapter assembly 520 generally includes a proximal housing 522, and a distal housing 524 non-rotatably coupled to proximal housing 522.

Proximal housing 522 of adapter assembly 520 has a mechanical interface, such as, for example, a female or male mating feature 526, configured to non-rotatably couple to a corresponding mating feature (not shown) of motor assembly 114 (FIG. 2) of instrument drive unit 110. As such, when adapter assembly 520 is coupled to instrument drive unit 110, a rotation of motor assembly 114 of instrument drive unit 110 results in a rotation of adapter assembly 520 and any surgical instrument attached thereto, for example, endoscope 200.

Proximal housing 522 of adapter assembly 520 has a main body 522a and a latch or door 522b pivotably coupled to main body 522a. Main body 522a defines an arcuate channel 529 therein configured for the passage of proximal ends of a light cable 212 and a communications cable 210 of endoscope 200, or any suitable wire or cable of endoscope 200, for example, a fiber optic cable. With a cable of endoscope 200 disposed within the arcuate channel 529, the configuration of the arcuate channel 529 is such that the arcuate channel 529 bends the cable of endoscope 200 and routs the proximal end of the cable of endoscope 200 in a distal direction.

Proximal housing 522 of adapter assembly 520 includes a locking assembly 530 disposed in the main body 522a and which is configured to releasably lock the door 522b of proximal housing 522 to main body 522a, as will be described herein. Locking assembly 530 includes a rotatable member or button 532, a biasing member, for example, a torsion spring 534, and a cap 536. The rotatable member 532 is rotatably disposed within main body 522a so as to not project from main body 522a, thereby reducing the likelihood of an inadvertent actuation of rotatable member 532. Rotatable member 532 has a finger 538 or lock extending laterally therefrom. The torsion spring 534 is disposed between rotatable member 532 and cap 536 and resiliently biases finger 538 of rotatable member 532 in a downward or distal direction. Cap 536 of locking assembly 530 maintains rotatable member 532 and spring 534 within main body 522a.

Door 522b of proximal housing 522 has an inwardly-extending projection 540 configured to selectively interlock with finger 538 of rotatable member 532 of locking assembly 530. In particular, projection 540 of door 522b has a ramped end 542 configured to engage finger 538 of rotatable member 532. Projection 540 of door 522b also defines a cutout 544 therein. In use, as door 522b of proximal housing 522 is closed (e.g., door 522b is pivoted towards main body 522a), ramped end 542 of projection 540 of door 522b engages finger 538 of rotatable member 532 to lift or raise finger 538 of rotatable member 532, which, in turn, rotates rotatable member 532 in a first direction (e.g., a clockwise direction). Upon closing door 522b of proximal housing 522, finger 538 of rotatable member 532 passes over ramped end 542 of projection 540 to permit the resilient bias of torsion spring 534 of locking assembly 530 to rotate rotatable member 532 in a second direction (e.g., a counter-clockwise direction) to seat or dispose finger 538 of rotatable member 532 in cutout 544 of projection 540. With finger 538 of locking assembly 530 disposed within cutout 544 of projection 540, opening door 522b relative to main housing 522a is resisted or prevented by the coupling of finger 538 of main body 522a and projection 540 of door 522b.

To disengage the locking assembly 530 of main body 522a from the projection 540 of door 522b, rotatable member 532 may be manually rotated in the first direction against the resilient bias of torsion spring 534 of locking assembly 530, thereby raising finger 538 of rotatable member 532 out of cutout 544 of projection 540. With finger 538 of rotatable member 532 out of engagement with projection 540 of door 522b, door 522b may be pivoted away from main body 522a to allow for the insertion or removal of endoscope 200 from adapter assembly 520.

Proximal housing 522a further includes a pair of pads 550a, 550b, wherein a first pad 550a of the pair of pads is coupled to main body 522a of proximal housing 522 and a second pad 550b of the pair of pads is coupled to the door 522b of proximal housing 522. Pads 550a, 550b are fabricated from a resilient material, for example, silicon or an elastomer. It is contemplated that pads 550a, 550b may be fabricated from any suitable material, for example, flexible or hard materials. Pads 550a, 550b are configured to capture a proximal portion of endoscope 200 therebetween when door 522b of proximal housing 522 is closed. As such, pads 550a, 550b eliminate backlash and increase stiffness between door 522b and main body 522 of proximal housing 522.

With continued reference to FIGS. 21A-25, distal housing 524 of adapter assembly 520 has a semi-cylindrical shape (see FIG. 21B) configured to partially surround endoscope 200. Distal housing 524 defines a hollow interior 528 having a generally non-circular shape, for example, rectangular, for non-rotatably retaining endoscope 200 therein. Due to the shape of hollow interior 528 of distal housing 524, a rotation of distal housing 524 of adapter assembly 520 causes endoscope 200 to rotate therewith.

Distal housing 524 defines an opening or window 552 therein to allow for a clinician to eject endoscope 200 from adapter assembly 520 by passing a finger or tool through window 552 while endoscope 200 is disposed within adapter assembly 520. Distal portion 524 defines an elongated cutout 554 configured to receive control buttons 203 of endoscope 200. Distal housing 524 defines an opening 546 in a distal end thereof that is coaxial with a longitudinal axis defined by the adapter assembly 520.

Distal housing 524 includes a flexible ring member 560 disposed therein. It is contemplated that ring member 560 may be fabricated from any suitable, flexible material, for example, an elastomer. Ring member 560 of distal housing 524 is configured to cup or partially surround an outer surface of proximal portion 202 of endoscope 200. Ring member 560 prevents endoscope 200 from sliding distally out of adapter assembly 520. Ring member 560 defines a bore 562 therethrough configured for receipt of endoscope 200. Bore 562 of ring member 560 is cone-shaped to receive a cone-shaped or tapered distal end 202b of proximal portion 202 of endoscope 200.

Adapter assembly 520 may include a memory 564, such as, for example, an identification chip (FIG. 22), that stores a variety of information regarding various components of system 1 (FIG. 1). For example, memory 564 may store identification information that can be used by system 1 to determine the identification of adapter assembly 520 or endoscope 200 connected to robotic arm 2 (FIG. 2). Based on the determined identification of an adapter assembly or endoscope, system 1 may or may not provide energy to the surgical assembly 100 (FIG. 2). For example, if the identification information stored in memory 564 does not match identification information provided by an adapter assembly, for example, adapter assembly 520, or an endoscope, for example, endoscope 200 (e.g., via a RFID tag on the adapter assembly 520 or endoscope 200), system 1 may not provide energy to any or all components of surgical assembly 100. In some embodiments, the memory 564 may also control and monitor the life of the adapter assembly 520.

Each of the adapter assemblies of the present disclosure may be fabricated from a variety of suitable materials, for example, PEEK, PEK, PEKK, PEKEKK, UDEL, RADEL PPS, PPSU, Ultem™, Valox™, and/or various non-conductive materials including thermoplastics or resin-based materials.

It will be understood that various modifications may be made to the embodiments disclosed herein. Therefore, the above description should not be construed as limiting, but merely as exemplifications of various embodiments. Those skilled in the art will envision other modifications within the scope and spirit of the claims appended thereto.

The invention claimed is:

1. An adapter assembly for connecting an endoscope to a robotic surgical system, the adapter assembly comprising:
    a housing configured to be coupled to an instrument drive unit of a robotic surgical system, the housing having a main body configured to house a proximal end of an endoscope;
    a memory disposed in mechanical cooperation with the housing, the memory configured to store information regarding at least one component of the surgical robotic system
    a door pivotably coupled to the housing and movable between an open position and a closed position; and
    a locking assembly disposed within the housing and configured to releasably lock the door to the housing to lock a portion of the endoscope in the adapter assembly, wherein the locking assembly includes:
        a rotatable button disposed within the main body of the housing, the rotatable button having a finger,
    wherein the door includes an inwardly-extending projection configured to selectively interlock with the finger of the rotatable button when the door is in the closed position, the projection having a ramped end configured to engage the finger of the rotatable button to rotate the rotatable button when the door is moving towards the closed position.

2. The adapter assembly according to claim 1, wherein the housing defines an arcuate channel therein configured for the passage of a proximal end of a cable of the endoscope.

3. The adapter assembly according to claim 2, wherein the arcuate channel is configured to bend the cable of the endoscope and route the proximal end of the cable of the endoscope in a distal direction.

4. The adapter assembly according to claim 1, wherein the projection of the door defines a cutout therein configured to receive at least a portion of the finger of the rotatable button.

5. The adapter assembly according to claim 1, wherein the rotatable button is recessed within the housing.

6. The adapter assembly according to claim 1, further comprising:
    a first pad coupled to the housing; and
    a second pad coupled to the door, the first pad and the second pad are configured to capture the proximal end of the endoscope therebetween when the door is in the closed position.

7. The adapter assembly according to claim 1, wherein the locking assembly includes a biasing member configured to bias the finger of the rotatable button.

8. The adapter assembly according to claim 7, wherein the ramped end of the projection is configured to engage the finger of the rotatable button to rotate the rotatable button against the resilient bias of the biasing member when the door is moving towards the closed position.

9. The adapter assembly according to claim 1, wherein the locking assembly includes a biasing member configured to bias the finger of the rotatable button in a distal direction.

10. An adapter assembly for connecting an endoscope to a robotic surgical system, the adapter assembly comprising:
    a proximal housing configured to be coupled to an instrument drive unit of a robotic surgical system, the proximal housing having a main body configured to house a proximal end of an endoscope, wherein the proximal housing defines an arcuate channel configured for the passage of a proximal end of a cable of the endoscope, and wherein the arcuate channel is configured to bend the cable of the endoscope and route the proximal end of the cable of the endoscope, extending proximally from the endoscope, out a side of the proximal housing;
    a distal housing extending distally from the proximal housing, the distal housing defining a hollow interior for non-rotatably retaining a portion of the endoscope therein;
    a door pivotably coupled to the proximal housing and movable between an open position and a closed position; and
    a locking assembly disposed within the proximal housing and configured to releasably lock the door to the proximal housing to lock the proximal end of endoscope in the adapter assembly, wherein the door is pivotably coupled to the main body of the proximal housing, and wherein the locking assembly includes:
  a rotatable button rotatably disposed within the main body of the proximal housing so as not to project therefrom, the rotatable button having a finger; and
  a biasing member resiliently biasing the finger of the rotatable button in a distal direction,
wherein the door has an inwardly-extending projection configured to selectively interlock with the finger of the rotatable member when the door is in the closed position, the projection having a ramped end configured to engage the finger of the rotatable button to rotate the rotatable button against the resilient bias of the biasing member as the door is moving towards the closed position,
wherein the projection of the door defines a cutout therein configured to receive at least a portion of the finger of the rotatable button to prevent the door from moving to the open position.

11. The adapter assembly according to claim 10, wherein the rotatable button is recessed within the proximal housing.

12. The adapter assembly according to claim 10, wherein the proximal housing includes a mechanical interface configured to non-rotatably couple to a corresponding mating feature of a motor assembly of the instrument drive unit such that the proximal housing, the distal housing, and the endoscope are configured to rotate together with the motor assembly about a longitudinal axis defined by the adapter assembly.

13. The adapter assembly according to claim 10, wherein the distal housing defines a window therein to allow for a clinician to eject the endoscope from the adapter assembly by passing a finger or tool through the window while the portion of the endoscope is disposed within the adapter assembly.

14. The adapter assembly according to claim 10, further comprising a flexible ring member disposed in a distal end of the distal housing, wherein the ring member prevents the endoscope from sliding distally out of the adapter assembly.

15. The adapter assembly according to claim 10, wherein the distal housing defines a semi-cylindrical shape configured to partially surround the endoscope.

16. The adapter assembly according to claim 10, wherein the distal housing defines an elongated cutout configured to receive control buttons of the endoscope.

17. The adapter assembly according to claim 10, wherein the proximal housing and the distal housing are separable from one another.

* * * * *